(12) United States Patent
Okayama et al.

(10) Patent No.: US 10,826,175 B2
(45) Date of Patent: Nov. 3, 2020

(54) ANTENNA APPARATUS FOR COMMUNICATING WITH NONCONTACT COMMUNICATION MEDIUM VIA ELECTROMAGNETIC WAVES

(71) Applicant: DENSO WAVE INCORPORATED, Chita-gun, Aichi-pref. (JP)

(72) Inventors: Yousuke Okayama, Chita-gun (JP); Eiji Muto, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 24 days.

(21) Appl. No.: 15/456,905

(22) Filed: Mar. 13, 2017

(65) Prior Publication Data

US 2017/0264013 A1 Sep. 14, 2017

(30) Foreign Application Priority Data

Mar. 14, 2016 (JP) ................ 2016-049354

(51) Int. Cl.
*H01Q 3/24* (2006.01)
*H01Q 1/22* (2006.01)
(Continued)

(52) U.S. Cl.
CPC ............ *H01Q 3/24* (2013.01); *H01Q 1/2216* (2013.01); *H01Q 1/2225* (2013.01);
(Continued)

(58) Field of Classification Search
CPC ...... H01Q 1/2216; H01Q 1/2225; H01Q 1/24; H01Q 1/241; H01Q 1/242; H01Q 1/243;
(Continued)

(56) References Cited

U.S. PATENT DOCUMENTS 5,940,029 A * 8/1999 Ninomiya ........... G01S 13/4409
342/154
6,356,242 B1 * 3/2002 Ploussios ................. H01Q 9/42
343/795
(Continued)

FOREIGN PATENT DOCUMENTS

| JP | S56-102107 A | 8/1981 |
| JP | 2008-219778 A | 9/2008 |
| KR | 101181465 B1 | 9/2012 |

*Primary Examiner* — Daniel Munoz
*Assistant Examiner* — Patrick R Holecek
(74) *Attorney, Agent, or Firm* — Oliff PLC

(57) ABSTRACT

An antenna apparatus includes: a switch having a single one-side terminal and four other-side terminals; and a distributor that distributes electric power supplied via the switch to a terminal and a terminal with a phase difference of 90 degrees. The apparatus further includes a switch that switches to either of a state in which conduction is achieved between an other-side terminal of the switch and a horizontally polarized wave antenna, and a state in which conduction is achieved between the terminal of the distributor and the horizontally polarized wave antenna. The apparatus further includes a switch that switches to either of a state in which conduction is achieved between an other-side terminal of the switch and a vertically polarized wave antenna, and a state in which conduction is achieved between the terminal of the distributor and the vertically polarized wave antenna. The switches are controlled by a control unit.

13 Claims, 13 Drawing Sheets

(51) Int. Cl.
*H01Q 21/24* (2006.01)
*H04B 7/10* (2017.01)
*H01Q 1/24* (2006.01)
*H01Q 3/26* (2006.01)

(52) U.S. Cl.
CPC ............ *H01Q 1/243* (2013.01); *H01Q 3/26* (2013.01); *H01Q 21/245* (2013.01); *H04B 7/10* (2013.01)

(58) Field of Classification Search
CPC .. H01Q 1/50; H01Q 3/24; H01Q 3/26; H01Q 3/2623; H01Q 3/30; H01Q 3/32; H01Q 3/34; H01Q 21/24; H01Q 21/245; H01Q 21/28; H01Q 25/001; H01Q 15/242; H04B 7/02; H04B 7/022; H04B 7/04; H04B 7/10
See application file for complete search history.

(56) References Cited

U.S. PATENT DOCUMENTS

| | | | | |
|---|---|---|---|---|
| 6,504,517 | B1* | 1/2003 | Liu | H01Q 1/246 343/853 |
| 6,560,443 | B1* | 5/2003 | Vaisanen | H01Q 3/24 455/553.1 |
| 6,731,920 | B1* | 5/2004 | Iwai | H01Q 1/243 343/702 |
| 6,919,861 | B2* | 7/2005 | Miyano | H01Q 1/2266 343/904 |
| 7,432,857 | B2* | 10/2008 | Yamamoto | G01S 3/30 342/374 |
| 7,486,249 | B2* | 2/2009 | Fujita | H01Q 9/065 343/700 MS |
| 7,486,975 | B2* | 2/2009 | Mori | H01Q 1/242 343/700 R |
| 7,720,441 | B2* | 5/2010 | Hwang | H04B 7/10 455/63.1 |
| 7,843,394 | B2* | 11/2010 | Egawa | H01Q 1/242 343/702 |
| 8,928,528 | B2* | 1/2015 | Harel | H01Q 3/00 342/373 |
| 2006/0187050 | A1* | 8/2006 | Wagner | G06K 7/0004 340/572.7 |
| 2010/0197261 | A1* | 8/2010 | Zibrik | H04B 7/0871 455/232.1 |

* cited by examiner

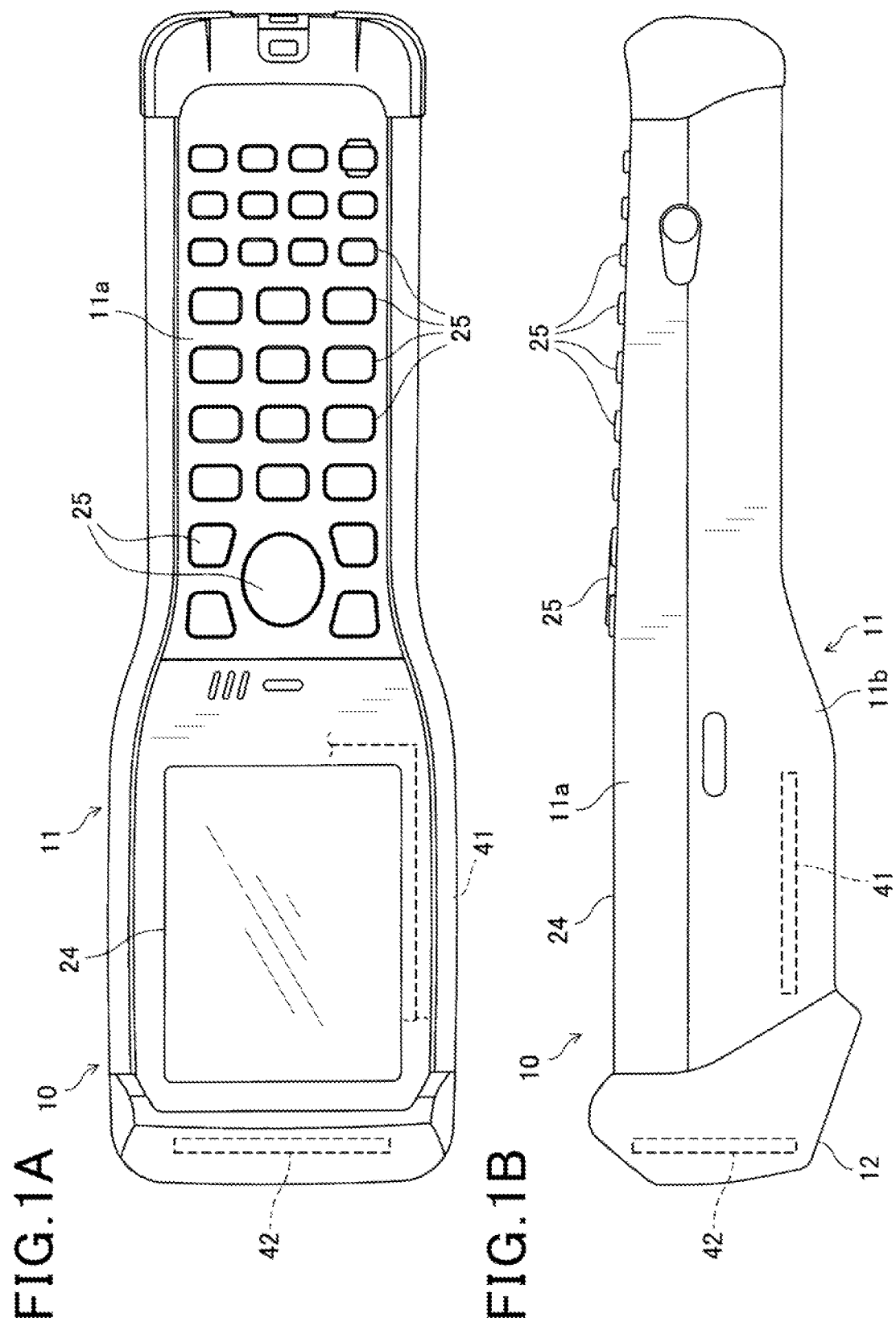

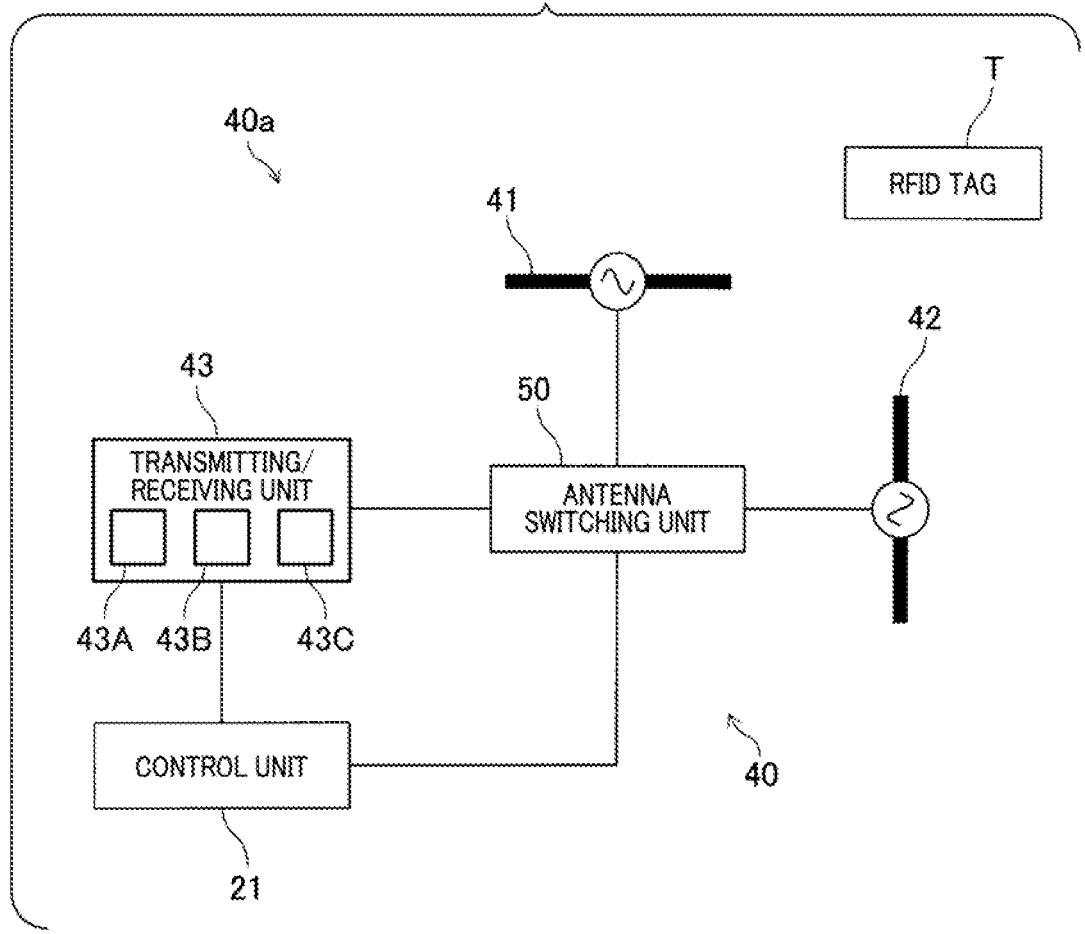

ANTENNA APPARATUS FOR COMMUNICATING WITH NONCONTACT COMMUNICATION MEDIUM VIA ELECTROMAGNETIC WAVES

CROSS-REFERENCE TO RELATED APPLICATION

This application is based on and claims the benefit of priority from earlier Japanese Patent Application No, 2016-049354 filed on Mar. 14, 2016, the descriptions of which is incorporated herein by reference.

BACKGROUND

Technical Field

The present invention relates to an antenna apparatus for communicating with a noncontact communication medium using electromagnetic waves.

Related Art

Systems that perform noncontact information communication between information media via radio waves (electromagnetic waves) are currently in heavy use. A radio frequency identifier (RFID) tag is a typical example of such information media.

Conventionally, in a reading apparatus that reads the RFID tags, circularly polarized waves that enable reading regardless of the orientation (arrangement direction) of the RFID tag are often used.

However, the circularly polarized waves are generated by electric power with a phase difference of 90 degrees being equally distributed between a horizontally polarized wave antenna and a vertically polarized wave antenna. Therefore, the electric power is halved, compared to linearly polarized waves such as horizontally polarized waves and vertically polarized waves. A problem occurs in that communication distance decreases to about 70%. Meanwhile, should a linearly polarized wave switching method, in which power supply is switched between that to the horizontally polarized wave antenna and that to the vertically polarized wave antenna based on time, be used to ensure communication distance, when either of the polarized waves are being outputted, the RFID tag at the orientation corresponding to the other of the polarized waves cannot be read.

Therefore, a problem occurs in that, in an environment in which a plurality of RFID tags of which the orientations are difficult to identify are to be read, reading of the RFID tags becomes time consuming, compared to cases in which the circularly polarized waves are used.

Therefore, a reading apparatus has been proposed that enables a user to switch to circularly polarized wave output in cases in which RFID tags arranged at various orientations are to be read at high speed, linearly polarized wave output in cases in which communication distance is to be increased, horizontally polarized wave output in cases in which an RFID tag oriented in the horizontal direction is to be read at high speed by long-distance communication, and vertically polarized wave output in cases in which an RFID tag oriented in the vertical direction is to be read at high speed by long-distance communication, with a single reading apparatus.

For example, in a switching apparatus for multi-polarization disclosed in PTL 1, below, a first switch is connected between a first input/output terminal, a third input/output terminal, and a 90-degree hybrid circuit. A second switch is connected between a second input/output terminal, a fourth input/output terminal, and the 90-degree hybrid circuit. Switching between linearly polarized waves and circularly polarized waves is performed based on switching of conduction states by operation of both switches. In particular, in the switching apparatus for multi-polarization disclosed in PTL 1, a configuration is disclosed in which the first switch is connected between the input terminal (first input/output terminal) and the 90-degree hybrid circuit, and the second switch is connected between one of the output terminals (second input/output terminal), the other of the output terminals (third input/output terminal), the first switch, and the 90-degree hybrid circuit, as a configuration for providing a single input terminal.

CITATION LIST

Patent Literature

[PTL 1] JP-A-2008-219778

SUMMARY OF INVENTION

Technical Problem

A phase difference of 90 degrees is required to be provided between the electric power supplied to the output terminal connected to the horizontally polarized wave antenna and the electric power supplied to the output terminal connected to the vertically polarized wave antenna, to output circularly polarized waves. However, in configurations such as that described above, a wiring pattern leading to the horizontally polarized wave antenna (a wiring pattern from the input-side terminal to one output-side terminal) and a wiring pattern leading to the vertically polarized wave antenna (a wiring pattern from the input-side terminal to the other output-side terminal) become asymmetrical. Therefore, while the wiring patterns are required to be designed taking into consideration phase differences attributed to the differences in wiring paths, trial productions including adjustment of the wiring patterns and the like become necessary because such phase differences are difficult to predict at the designing stage. A problem occurs in that wiring pattern design becomes complicated.

SUMMARY

Taking into consideration the foregoing problems, providing an antenna apparatus that enables simplification of wiring pattern design while enabling switching between polarized waves, such as horizontally polarized waves and vertically polarized waves, is desired.

To achieve the above-described object, a typical example of an antenna apparatus includes:

a horizontally polarized wave antenna for emitting horizontally polarized waves as radio waves;

a vertically polarized wave antenna for emitting vertically polarized waves as radio waves;

a first switch that has a single one-side terminal to which electric power from an outside source is supplied during output of the radio waves and a plurality of other-side terminals, and achieves conduction between any one of the plurality of other-side terminals and the one-side terminal;

a distributor that has a first distributor other-side terminal and a second distributor other-side terminal, and distributes the electric power supplied via the first switch to the first distributor other-side terminal and the second distributor other-side terminal with a phase difference of 90 degrees;

a second switch that switches to either of a state in which conduction is achieved between a first other-side terminal of the first switch and the horizontally polarized wave antenna, and a state in which conduction is achieved between the first distributor other-side terminal of the distributor and the horizontally polarized wave antenna;

a third switch that switches to either of a state in which conduction is achieved between a second other-side terminal of the first switch and the vertically polarized wave antenna, and a state in which conduction is achieved between the second distributor other-side terminal of the distributor and the vertically polarized wave antenna; and a control unit that controls the conduction state of the first switch, the second switch, and the third switch such as to switch the polarized waves emitted as the radio waves, using at least either of the horizontally polarized wave antenna and the vertically polarized wave antenna.

Reference numbers within the parentheses, above, indicate corresponding relationships with specific means according to embodiments described hereafter.

In the typical example, the conduction state of the first, second, and third switches, that is, the electrical connection between the terminals of the switches is controlled by the control unit.

As a result, in a state in which electric power is supplied via the one-side terminal, horizontally polarized radio waves are outputted via the horizontally polarized wave antenna when conduction is achieved between the first other-side terminal of the first switch and the horizontally polarized wave antenna. Meanwhile, vertically polarized radio waves are outputted via the vertically polarized wave antenna when conduction is achieved between the second other-side terminal of the first switch and the vertically polarized wave antenna. In addition, based on control of the switches by the control unit, when electric power is supplied to the distributor via the first switch, the horizontally polarized radio waves outputted via the horizontally polarized wave antenna and the vertically polarized radio waves outputted via the vertically polarized wave antenna have a phase difference of 90 degrees. Therefore, circularly polarized radio waves are outputted.

In particular, a wiring pattern is formed in which the second switch and the third switch are respectively arranged between the first switch, and the horizontally polarized wave antenna and the vertically polarized wave antenna, and the distributor is arranged between the first switch, and the second switch and the third switch. Therefore, the wiring pattern leading to the horizontally polarized wave antenna and the wiring pattern leading to the vertically polarized wave antenna can be arranged such as to be physically symmetrical on a printed board. Consequently, an antenna apparatus that enables simplification of wiring pattern design while enabling switching between polarized waves, such as horizontally polarized waves and vertically polarized waves, can be actualized.

In a favorable example, the distributor applies a phase difference to the electric power supplied to the first distributor other-side terminal via a first distributor one-side terminal connected to a third other-side terminal of the first switch that is a delay of 90 degrees in relation to the electric power supplied to the second distributor other-side terminal via the first distributor one-side terminal. The distributor applies a phase difference to the electric power supplied to the second distributor other-side terminal via a second distributor one-side terminal connected to a fourth other-side terminal of the first switch that is a delay of 90 degrees in relation to the electric power supplied to the first distributor other-side terminal via the second distributor one-side terminal.

Therefore, right-handed circularly polarized radio waves can be outputted by the phase of the electric power supplied to the horizontally polarized wave antenna being delayed by 90 degrees in relation to the phase of the electric power supplied to the vertically polarized wave antenna. In addition, left-handed circularly polarized radio waves can be outputted by the phase of the electric power supplied to the vertically polarized wave antenna being delayed by 90 degrees in relation to the phase of the electric power supplied to the horizontally polarized wave antenna. Consequently, switching not only to the horizontally polarized wave and the vertically polarized wave, but also to the two types of circularly polarized waves, the right-handed circularly polarized waves and the left-handed circularly polarized waves. Usefulness can be improved.

In another favorable example, a phase shifter that applies a delay of 90 degrees to electric power is provided between either of the second switch and the horizontally polarized wave antenna, and the third switch and the vertically polarized wave antenna.

As a result, switching can be performed not only to the horizontally polarized wave and the vertically polarized wave, but also to diagonally polarized waves generated when the phase of the electric power supplied to the horizontally polarized wave antenna and the phase of the electric power supplied to the vertically polarized wave antenna become identical, and diagonally polarized waves generated when the phase difference between the phase of the electric power supplied to the horizontally polarized wave antenna and the phase of the electric power supplied to the vertically polarized wave antenna is 180 degrees. Usefulness can be improved.

In still another favorable example, a conduction state of a phase shifter switch is controlled by the control unit. The phase shifter switch switches to either of a conduction state in which phase shifting by the phase shifter is performed and a conduction state in which phase shifting by the phase shifter is canceled.

Therefore, switching can be performed from the state enabling output of the diagonally polarized radio waves generated by the phase of the electric power supplied to the horizontally polarized wave antenna and the phase of the electric power supplied to the vertically polarized wave antenna becoming identical as a result of phase shifting by the phase shifter, to the state enabling output of the circularly polarized radio waves generated by the phase difference between the phase of the electric power supplied to the horizontally polarized wave antenna and the phase of the electric power supplied to the vertically polarized wave antenna becoming 90 degrees as a result of phase shifting by the phase shifter being canceled. In addition, switching can be performed from the state enabling output of the diagonally polarized radio waves generated by the phase difference between the phase of the electric power supplied to the horizontally polarized wave antenna and the phase of the electric power supplied to the vertically polarized wave antenna becoming 180 degrees as a result of phase shifting by the phase shifter, to the state enabling output of the circularly polarized radio waves generated by the phase difference between the phase of the electric power supplied to the horizontally polarized wave antenna and the phase of the electric power supplied to the vertically polarized wave antenna becoming 90 degrees as a result of phase shifting by the phase shifter being canceled. Consequently, switching can be performed not only to the horizontally polarized waves, the vertically polarized waves, and the diagonally polarized waves, but also to the circularly polarized waves. Usefulness can be further improved.

BRIEF DESCRIPTION OF DRAWINGS

In the accompanying drawings:

FIG. 1A is a planar view of a configuration overview of a mobile terminal according to a first embodiment;

FIG. 1B is a side view of a configuration overview of the mobile terminal according to the first embodiment;

FIG. 3 is a block diagram schematically showing an example of a noncontact communicating unit;

DETAILED DESCRIPTION OF THE PREFERRED EMBODIMENTS

Figure 2A:
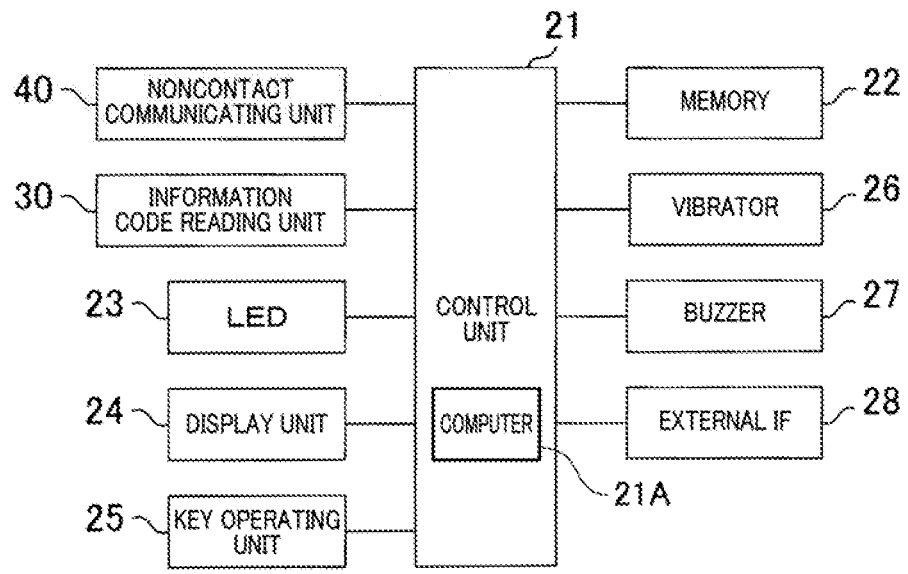
FIG. 2A is a block diagram of an example of an electrical configuration of the mobile terminal according to the first embodiment.

Various embodiments of an antenna apparatus of the present invention will hereinafter be described with reference to the accompanying drawings.

First Embodiment

First, a first embodiment realizing a mobile terminal that includes an antenna apparatus of the present invention will be described with reference to the drawings.

A mobile terminal 10 according to the present embodiment is configured as a mobile-type information terminal that is carried by a user and used in various locations. The mobile terminal 10 provides a function as an information code reader, in addition to a function as an RFID tag reader/writer, and is configured to be capable of reading based on two methods. The RFID tag reader/writer reads and writes information stored on an RFID tag (noncontact communication medium) T using radio waves (electromagnetic waves) transmitted and received via an antenna as a medium. The information code reader reads information codes, such as barcodes and two-dimensional codes such as QR codes (registered trademark).

As shown in FIG. 1A and FIG. 1B, the exterior of the mobile terminal 10 is formed by an elongated housing 11. The housing 11 is composed of an upper case 11a and a lower case 11b that are assembled together. The upper case 11a and the lower case 11b are made of a synthetic resin material, such as acrylonitrile butadiene styrene (ABS) resin. In addition, a key operating unit 25, a display unit 24, and the like are arranged in the upper case 11a. The key operating unit 25 includes function keys, a numeric key pad, and the like that are operated to input predetermined information. The display unit 24 displays predetermined information. A reading opening 12 that opens downward is provided in the lower case 11b.

As shown in FIG. 2A, a control unit 21 is provided within the housing 11 of the mobile terminal 10. The control unit 21 controls the overall mobile terminal 10. The control unit 21 is mainly configured by a microcomputer 21A. That is, the microcomputer 21A has a central processing unit (CPU), a system bus, an input/output interface, and the like (not shown). The microcomputer 21A, together with an external memory 22, configures an information processing unit. The memory 22 may be provided within the control unit 21 or may be included within the microcomputer 21A.

The memory 22 functions as a "non-transient computer readable medium." A predetermined program for performing a reading process to read the RFID tag T by noncontact communication via radio waves (electromagnetic waves), and other necessary programs are stored in the memory 22 in advance, such as to be executable by the control unit 21. Therefore, for example, the microcomputer 21A (that is, the CPU) runs the program for the reading process based on an interactive request from the user. As a result of the program being executed, the microcomputer 21A is able to generate switching signals CS for switching operations of switches, described hereafter.

In addition, a light-emitting diode (LED) 23, a display unit 24, the key operating unit 25, a vibrator 26, a buzzer 27, an external interface 28, and the like are connected to the control unit 21.

The key operating unit 25 is configured to provide the control unit 21 with operating signals. The control unit 21 receives the operating signals and performs operations based on the content of the operating signals. In addition, the LED 23, the display unit 24, the vibrator 26, and the buzzer 27 are configured to be controlled by the control unit 21. The LED 23, the display unit 24, the vibrator 26, and the buzzer 27 are each operated based on commands received from the control unit 21. Furthermore, the external interface 28 is configured as an interface for performing data communication with external apparatuses and the like. The external interface 28 is configured to perform communication process in cooperation with the control unit 21. Moreover, a power supply unit (not shown) is provided within the housing 11. Electric power is supplied to the control unit 21 and various electrical components by the power supply unit, a battery, or the like.

In addition, an information code reading unit 30 and a noncontact communicating unit 40 are connected to the control unit 21.

Figure 2B:
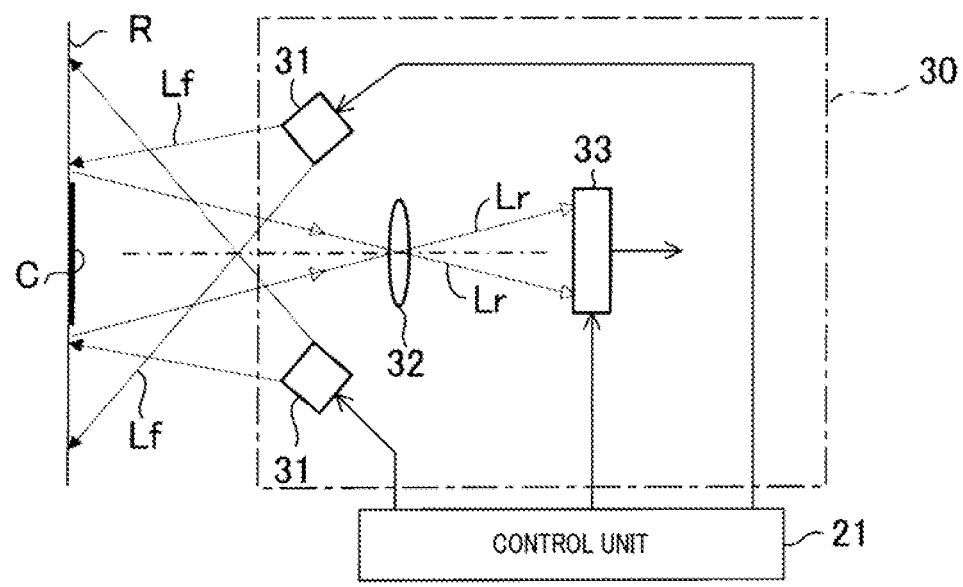
FIG. 2B is a block diagram schematically showing an example of an information code reading unit

First, the information code reading unit 30 will be described with reference to FIG. 2B.

The information code reading unit 30 functions to optically read an information code. As shown in FIG. 2B, the information code reading unit 30 is configured to include a light receiving sensor 33, an image forming lens 32, an illuminating unit 32, and the like. The light receiving sensor 33 is composed of a charge-coupled device (CCD) area sensor. The illuminating unit 32 is composed of a plurality of LEDs, a lens, and the like. The information code reading unit 30 functions to read an information code C (a bar code, a two-dimensional code, or the like) attached to a reading target R, in cooperation with the control unit 21.

When the information code reading unit 30 performs reading, first, the illuminating unit 31 that has received a command from the control unit 21 emits illumination light Lf. The illumination light Lf passes through the reading opening 12 and is irradiated onto the reading target R. Then, reflected light Lr, which is the illumination light Lf reflected by the information code C, passes through the reading opening 12 and is taken into the apparatus. The reflected light Lr then passes through the image forming lens 32 and is received by the light receiving sensor 33. The image forming lens 32 that is disposed between the reading opening 12 and the light receiving sensor 33 is configured to form an image of the information code C on the light receiving sensor 33. The light receiving sensor 33 outputs a light reception signal based on the image of the information code C. The light reception signal outputted from the light receiving sensor 33 is stored in the memory 22 (see FIG. 2A) as image data, and is used for a decoding process to acquire information included in the information code C. The information code reading unit 30 is provided with an amplifier circuit that amplifies the signal from the light receiving sensor 33, an analog-to-digital (AD) converter circuit that converts the amplified signal to a digital signal, and the like. However, these circuits are omitted from the drawings.

Next, the noncontact communicating unit 40 will be described with reference to FIG. 3.

The noncontact communicating unit 40 functions to perform noncontact communication (wireless communication) with the RFID tag T by radio waves (electromagnetic waves), in cooperation with the control unit 21. The noncontact communicating unit 40 also functions to read data stored in the RFID tag T or write data in the RFID tag T. The noncontact communicating unit 40 is configured as an antenna apparatus 40a together with the control unit 21, as a circuit that performs transmission based on a publicly known radio wave format. As schematically shown in FIG. 3, a horizontally polarized wave antenna 41 (also see FIG. 1A and FIG. 1B), a vertically polarized wave antenna 42 (also see FIG. 1A and FIG. 1B), a transmitting/receiving unit 43, and an antenna switching unit 50 are provided.

The horizontally polarized wave antenna 41 and the vertically polarized wave antenna 42 are publicly known antennas of which respective polarization planes are perpendicular to each other. The horizontally polarized wave antenna 41 and the vertically polarized wave antenna 42 are respectively configured to be capable of transmitting and receiving horizontally polarized radio waves and vertically polarized radio waves. That is, the antenna apparatus 40a is configured to be capable of switching between a plurality of types of radio waves (electromagnetic waves) having differing polarization planes, and transmitting and receiving the plurality of types of radio waves (electromagnetic waves).

For example, the horizontally polarized wave antenna 41 and the vertically polarized wave antenna 42 may be configured as a dual-feed patch antenna or a cross-dipole antenna.

The transmitting/receiving unit 43 is configured such that, under the control of the control unit 21, predetermined electric power is supplied to at least either of the horizontally polarized wave antenna 41 and the vertically polarized wave antenna 42 via the antenna switching unit 50 during output of radio waves based on transmission data, and electric power based on reception data is supplied via the antenna switching unit 50 during reception of the reception data. Specifically, the transmitting/receiving unit 43 is configured to include a transmission circuit 43A, a reception circuit 43B, a matching circuit 43C, and the like.

The transmission circuit 43A is configured to have a publicly known circuit configuration composed of a carrier oscillator, an encoding unit, an amplifier, a transmitting unit filter, a modulating unit, and the like. The transmission circuit 43A has a configuration in which carrier waves of a predetermined frequency are outputted from the carrier oscillator. In addition, the encoding unit is connected to the control unit 21. The encoding unit encodes the transmission data outputted from the control unit 21 and outputs the encoded transmission data to the modulating unit. The modulating unit generates a modulated signal by modulating the carrier waves from the carrier oscillator, and carrier waves outputted from the carrier oscillator that is a portion in which the transmission data from the encoding unit is inputted, by amplitude shift keying (ASK) modulation using an encoded transmission code (modulation signal) outputted from the encoding unit during command transmission to a communication subject. The modulating unit then outputs the generated modulated signal to the amplifier. The amplifier amplifies the input signal (the modulated signal modulated by the modulating unit) at a predetermined gain and outputs the amplified signal to the transmitting unit filter. The transmitting unit filter outputs, to the antenna switching unit 50 via the matching circuit 43C, a transmission signal obtained by filtering the amplified signal from the amplifier. When the transmission signal is outputted to the antenna switching unit 50 in this way, the transmission signal is emitted outside from at least either of the horizontally polarized wave antenna 41 and the vertically polarized wave antenna 42 as radio waves (electromagnetic waves).

Meanwhile, the radio waves (electromagnetic waves) received as a response signal via the antenna switching unit 50 as a result of being received by at least either of the horizontally polarized wave antenna 41 and the vertically polarized wave antenna 42 are inputted to the reception circuit 43B via the matching circuit 43C. The reception circuit 43B is configured by a receiving unit filter, an amplifier, a demodulating unit, a binarization processing unit, a decoding unit, and the like. After the response signal received via the antenna switching unit 50 is filtered by the receiving unit filter, the filtered signal is amplified by the amplifier, and the amplified signal is demodulated by the demodulating unit. Then, the demodulated signal waveform is binarized by the binarization processing unit and decoded by the decoding unit. The decoded signal is then outputted to the control unit 21 as reception data.

Figure 4:
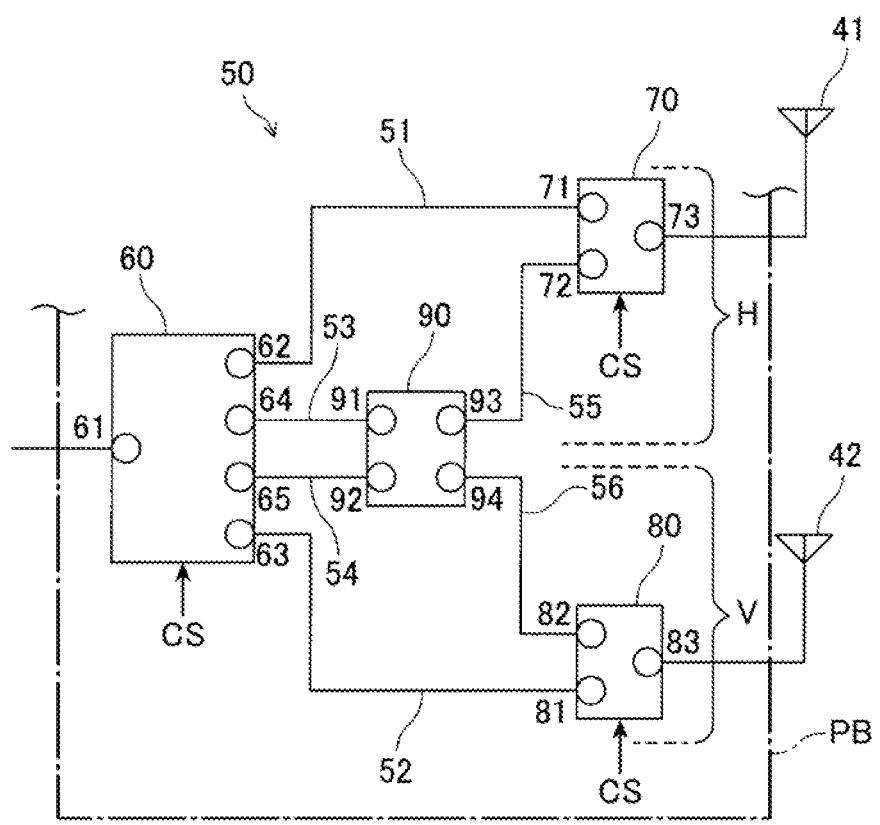
FIG. 4 is a circuit diagram schematically showing switches and wiring patterns configuring an antenna switching unit.

The antenna switching unit 50 functions as a multi-polarization switching means. The antenna switching unit 50 is electrically connected to the transmitting/receiving unit 43, and to the horizontally polarized wave antenna 41 and the vertically polarized wave antenna 42 in a selective manner, based on the switching signal CS sent from the control unit 21. The antenna switching unit 50 thereby switches the polarization planes of the radio waves to be transmitted and received, or in other words, switches between polarized waves. According to the present embodiment, the antenna switching unit 50 is configured to be capable of switching among a total of four types of polarized waves that are two types of linearly polarized waves and two types of circularly polarized waves. The two types of linearly polarized waves are horizontally polarized waves and vertically polarized waves. The two types of circularly polarized waves are right-handed circularly polarized waves and left-handed circularly polarized waves. As shown in FIG. 4, the antenna switching unit 50 includes three switches 60, 70, and 80, and a distributor 90 that are mounted on a printed board PB. The switches 60, 70, and 80 serve as electronic analog switches.

Figure 5:
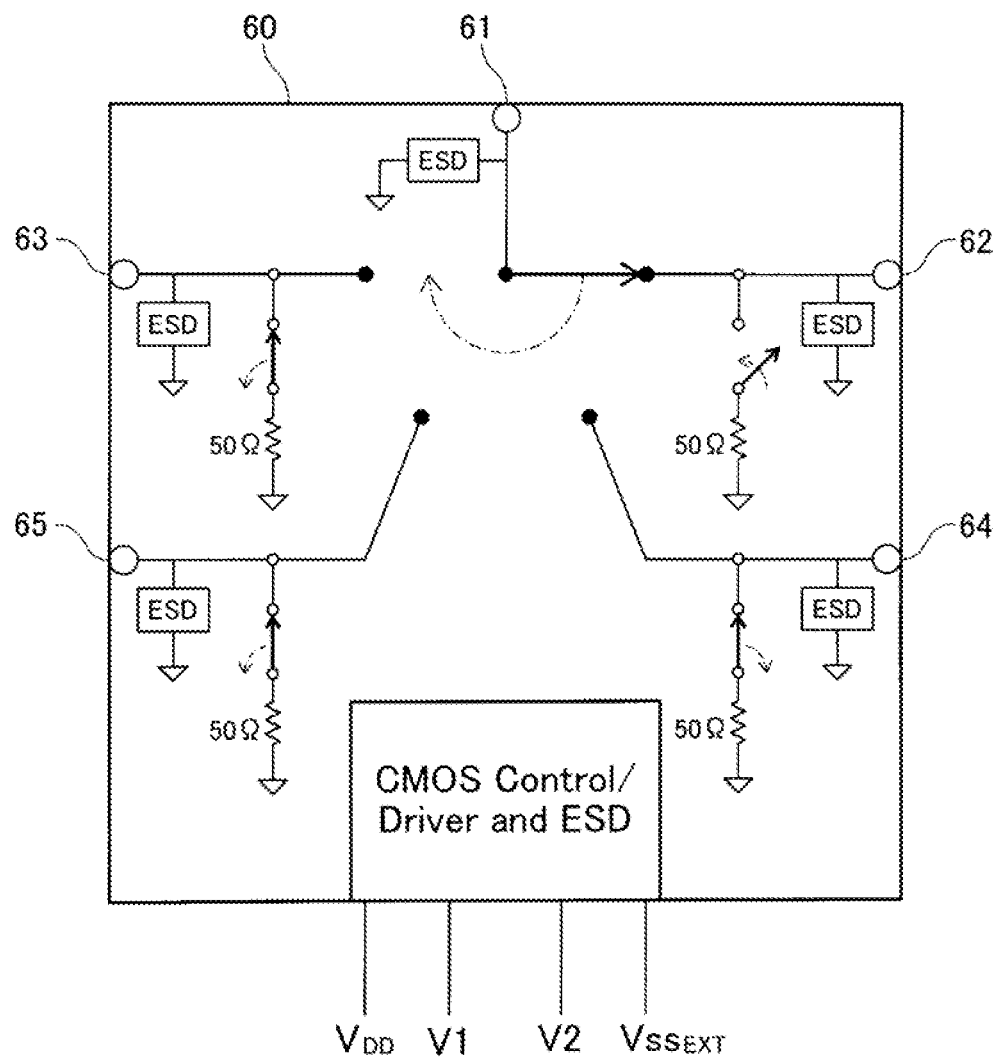
FIG. 5 is a circuit diagram schematically showing a configuration of a first switch.

As shown in FIG. 4 and FIG. 5, the switch 60 is a single-pole four-throw (SP4T) switch that has a single one-side terminal 61 and four other-side terminals 62 to 65. Electric power from an external source is supplied to the one-side terminal 61 during radio wave output. The switch 60 functions to achieve conduction between any one of the other-side terminals 62 to 65 and the one-side terminal 61 based on the switching signal CS. In particular, according to the present embodiment, as FIG. 5 clearly indicates, the switch 60 is configured such that, when conduction is achieved between any one of the other-side terminals and the one-side terminal 61 under the control of the control unit 21, the remaining other-side terminals are connected to terminating resistors. In the example in FIG. 5, a state in which the other-side terminal 62 and the one-side terminal 61 are connected, and the remaining other-side terminals 63 to 65 are connected to terminating resistors having a resistance of 50Ω, under the control of the control unit 21, is shown. The switch 60 may correspond to an example of a "first switch."

The switch 70 functions as a switch that switches to either of a state in which conduction is achieved between the other-side terminal 62 of the switch 60 and the horizontally polarized wave antenna 41, and a state in which conduction is achieved between a terminal 93 of the distributor 90, described hereafter, and the horizontally polarized wave antenna 41, based on the switching signal CS sent from the control unit 21. The switch 70 is a single-pole double-throw (SPDT) switch that has a terminal 71 connected to the other-side terminal 62 of the switch 60, a terminal 72 connected to the terminal 93 of the distributor 90, and a terminal 73 connected to the horizontally polarized wave antenna 41. The switch 70 functions to achieve conduction between either of the terminal 71 and the terminal 72, and the terminal 73. Therefore, when conduction is to be achieved between the other-side terminal 62 of the switch 60 and the horizontally polarized wave antenna 41, the switch 70 is controlled by the control unit 21 to achieve conduction between the terminal 71 and the terminal 73. When conduction is to be achieved between the terminal 93 of the distributor 90 and the horizontally polarized wave antenna 41, the switch 70 is controlled by the control unit 21 to achieve conduction between the terminal 72 and the terminal 73. The switch 70 may correspond to an example of a "second switch" and the other-side terminal 62 may correspond to an example of a "first other-side terminal."

The switch 80 functions as a switch that switches to either of a state in which conduction is achieved between the other-side terminal 63 of the switch 60 and the vertically polarized wave antenna 42, and a state in which conduction is achieved between a terminal 94 of the distributor 90, described hereafter, and the vertically polarized wave antenna 42, based on the switching signal CS sent from the control unit 21. The switch 80 is a single-pole double-throw (SPDT) switch that has a terminal 81 connected to the other-side terminal 63 of the switch 60, a terminal 82 connected to the terminal 94 of the distributor 90, and a terminal 83 connected to the vertically polarized wave antenna 42. The switch 80 functions to achieve conduction between either of the terminal 81 and the terminal 82, and the terminal 83. Therefore, when conduction is to be achieved between the other-side terminal 63 of the switch 60 and the vertically polarized wave antenna 42, the switch 80 is controlled by the control unit 21 to achieve conduction between the terminal 81 and the terminal 83. When conduction is to be achieved between the terminal 94 of the distributor 90 and the vertically polarized wave antenna 42, the switch 80 is controlled by the control unit 21 to achieve conduction between the terminal 82 and the terminal 83. The switch 80 may correspond to an example of a "third switch" and the other-side terminal 63 may correspond to an example of a "second other-side terminal."

The distributor 90 has four terminals 91 to 94. The distributor 90 is configured as a 90-degree hybrid circuit that distributes electric power supplied from the terminal 91 or the terminal 92 to the terminal 93 and the terminal 94 with a phase difference of 90 degrees. In addition, the terminal 91 is connected to the other-side terminal 64 of the switch 60. The terminal 92 is connected to the other-side terminal 65 of the switch 60. The terminal 93 is connected to the terminal 72 of the switch 70. The terminal 94 is connected to the terminal 82 of the switch 80. The other-side terminal 64 may correspond to an example of a "third other-side terminal." The other-side terminal 65 may correspond to an example of a "fourth other-side terminal." In addition, the terminal 91 may correspond to an example of a "first distributor one-side terminal." The terminal 92 may correspond to an example of a "second distributor one-side terminal." The terminal 93 may correspond to an example of a "first distributor other-side terminal." The terminal 94 may correspond to an example of a "second distributor other-side terminal."

In particular, according to the present embodiment, the distributor 90 is configured such that the electric power supplied to the terminal 93 via the terminal 91 has a phase difference that is a delay by 90 degrees in relation to the electric power supplied to the terminal 94 via the terminal 91, and the electric power supplied to the terminal 94 via the terminal 92 has a phase difference that is a delay by 90 degrees in relation to the electric power supplied to the terminal 93 via the terminal 92.

Furthermore, as shown in FIG. 4, the terminal 62 of the switch 60 and the terminal 71 of the switch 70 are connected by a wiring pattern 51 on the board PB. The terminal 63 of the switch 60 and the terminal 81 of the switch 80 are connected by a wiring pattern 52 on the board PB. In addition, the terminal 64 of the switch 60 and the terminal 91 of the distributor 90 are connected by a wiring pattern 53 on the board PB. The terminal 65 of the switch 60 and the terminal 92 of the distributor 90 are connected by a wiring pattern 54 on the board PB. Moreover, the terminal 93 of the distributor 90 and the terminal 72 of the switch 70 are connected by a wiring pattern 55 on the board PB. The terminal 94 of the distributor 90 and the terminal 82 of the switch 80 are connected by a wiring pattern 56 on the board PB.

In this way, the antenna switching unit 50 is a wiring pattern on the board PB in which the switch 70 and the switch 80 are respectively arranged between the switch 60, and the horizontally polarized wave antenna 41 and the vertically polarized wave antenna 42. The distributor 90 is arranged between the switch 60, and the switch 70 and the switch 80. Therefore, the wiring pattern leading to the horizontally polarized wave antenna 41 and the wiring pattern leading to the vertically polarized wave antenna 42 can be arranged such as to be physically symmetrical on the board PB. The wiring pattern leading to the horizontally polarized wave antenna 41 is the wiring pattern 51 directly connecting the switch 60 and the switch 70, and the wiring patterns 53 and 55 connecting the switch 60 and the switch 70 via the distributor 90. In addition, the wiring pattern leading to the vertically polarized wave antenna 42 is the wiring pattern 52 directly connecting the switch 60 and the switch 80, and the wiring patterns 54 and 56 connecting the switch 60 and the switch 80 via the distributor 90.

Next, control of the antenna switching unit 50 by the control unit 21 to selectively switch among the total of four types of radio waves (polarization planes thereof) as the radio waves to be transmitted and received will be described with reference to FIG. 6A, FIG. 6B, FIG. 7A, and FIG. 7B. The four types of radio waves are the horizontally polarized waves, the vertically polarized waves, the right-handed circularly polarized waves, and the left-handed circularly polarized waves.

Figure 6A:
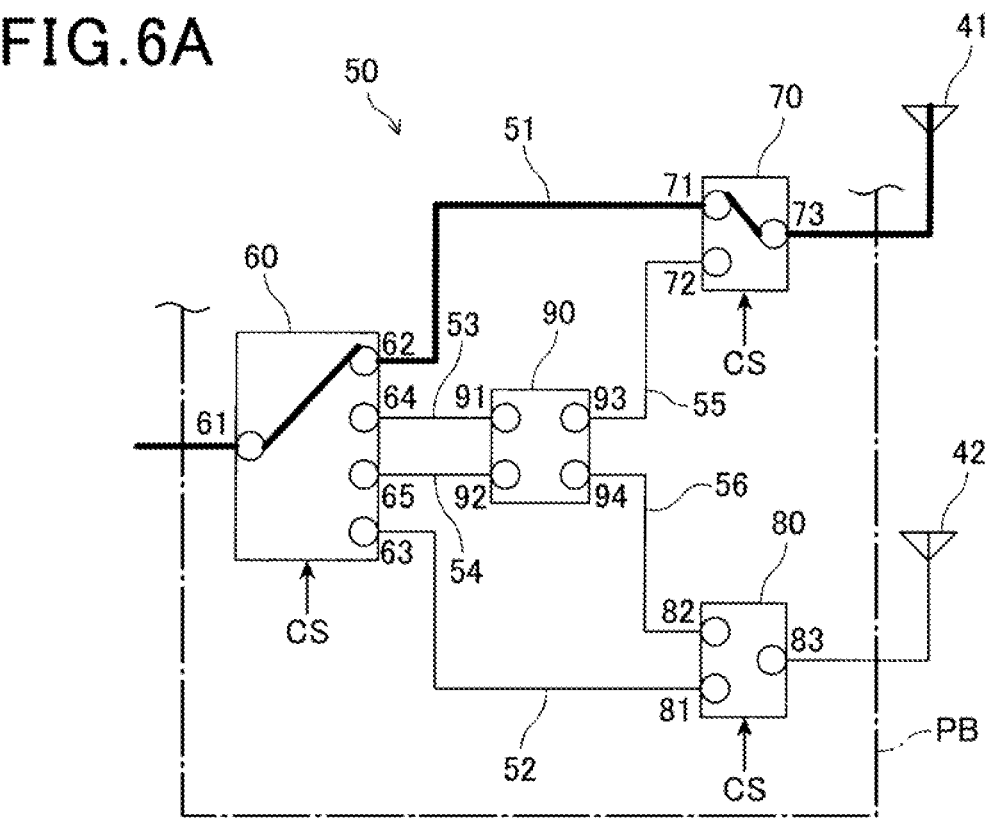
FIG. 6A is an explanatory diagram of a conduction state for linearly polarized waves according to the first embodiment, particularly showing a conduction state for switching to horizontally polarized waves.

First, a case in which the RFID tag T is read through use of the horizontally polarized waves will be described with reference to FIG. 6A. In this case, based on the switching signal CS sent from the control unit 21, as shown in FIG. 6A, conduction is achieved between the one-side terminal 61 and the other-side terminal 62 in the switch 60, and conduction is achieved between the terminal 71 and the terminal 73 in the switch 70. As a result, conduction is achieved between the one-side terminal 61 of the switch 60 and the horizontally polarized wave antenna 41. In this conduction state, the horizontally polarized radio waves are outputted as a result of electric power for radio-wave output being supplied from the transmitting/receiving unit 43 controlled by the control unit 21, via the one-side terminal 61 of the switch 60. The information in the RFID tag T is read based on the radio waves received from the RFID tag T based on the output.

Figure 6B:
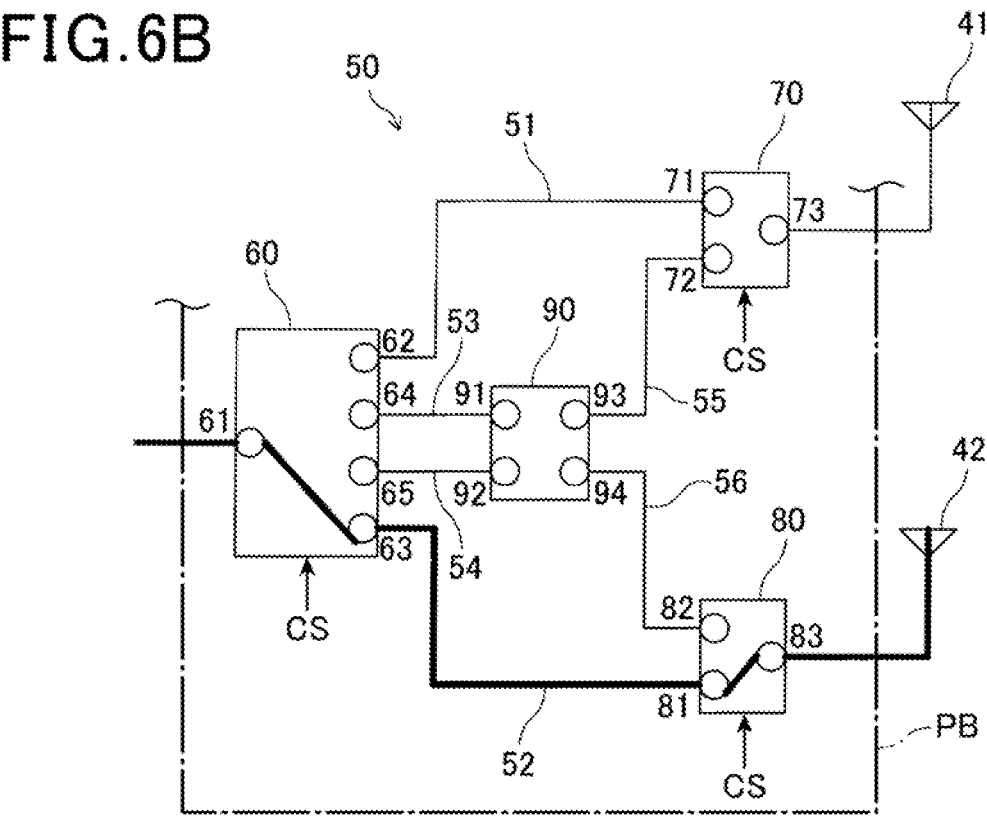
FIG. 6B is an explanatory diagram of a conduction state for linearly polarized waves according to the first embodiment, particularly showing a conduction state for switching to vertically polarized waves.

Next, a case in which the RFID tag T is read through use of the vertically polarized waves will be described with reference to FIG. 6B. In this case, based on the switching signal CS sent from the control unit 21, as shown in FIG. 6B, conduction is achieved between the one-side terminal 61 and the other-side terminal 63 in the switch 60, and conduction is achieved between the terminal 81 and the terminal 83 in the switch 80. As a result, conduction is achieved between the one-side terminal 61 of the switch 60 and the vertically polarized wave antenna 42. In this conduction state, the vertically polarized radio waves are outputted as a result of electric power for radio-wave output being supplied from the transmitting/receiving unit 43 controlled by the control unit 21, via the one-side terminal 61 of the switch 60. The information in the RFID tag T is read based on the radio waves received from the RFID tag T based on the output.

Figure 7A:
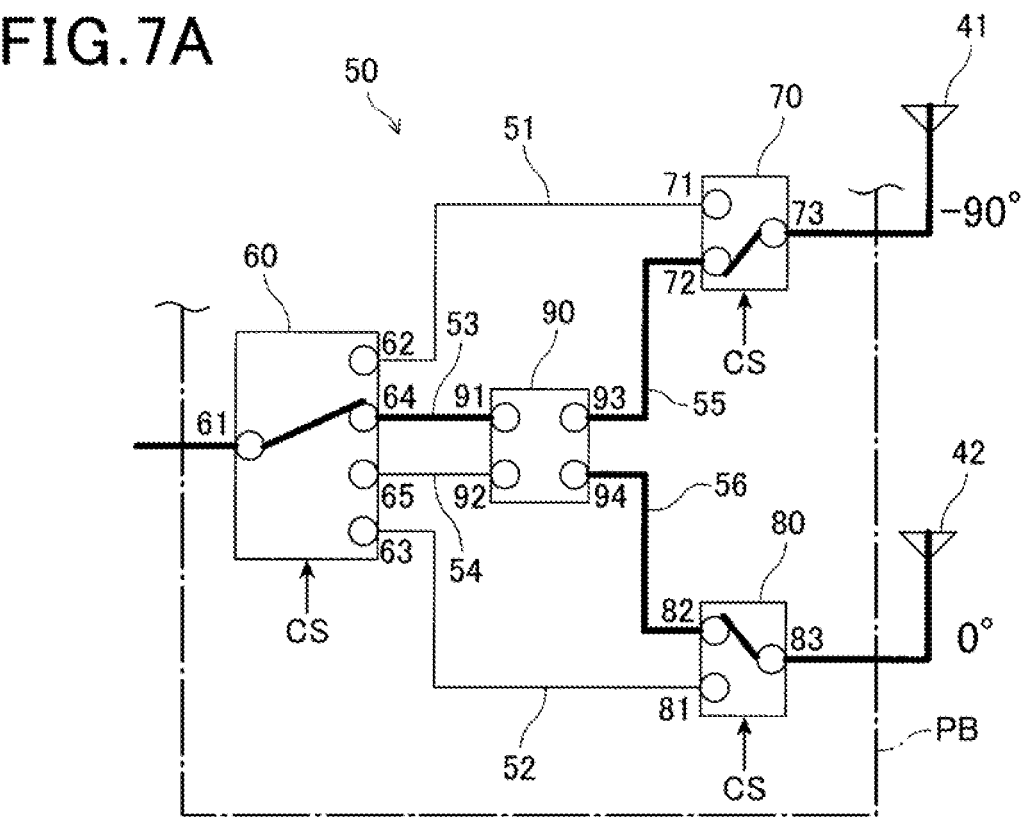
FIG. 7A is an explanatory diagram of a conduction state for circularly polarized waves according to the first embodiment, particularly showing a conduction state for switching to right-handed circularly polarized waves.

Next, a case in which the RFID tag T is read through use of the right-handed circularly polarized waves will be described with reference to FIG. 7A. In this case, based on the switching signal CS sent from the control unit 21, as shown in FIG. 7A, conduction is achieved between the one-side terminal 61 and the other-side terminal 64 in the switch 60, conduction is achieved between the terminal 72 and the terminal 73 in the switch 70, and conduction is achieved between the terminal 82 and the terminal 83 in the switch 80. In this conduction state, as a result of electric power for radio-wave output being supplied from the transmitting/receiving unit 43 controlled by the control unit 21, via the one-side terminal 61 of the switch 60, the electric power supplied to the terminal 93 via the terminal 91 has a phase difference that is a delay by 90 degrees in relation to the electric power supplied to the terminal 94 via the terminal 91. As a result, because the phase of the electric power supplied to the horizontally polarized wave antenna 41 is delayed by 90 degrees in relation to the phase of the electric power supplied to the vertically polarized wave antenna 42, the right-handed circularly polarized radio waves are outputted. The information in the RFID tag T is read based on the radio waves received from the RFID tag T based on the output.

Figure 7B:
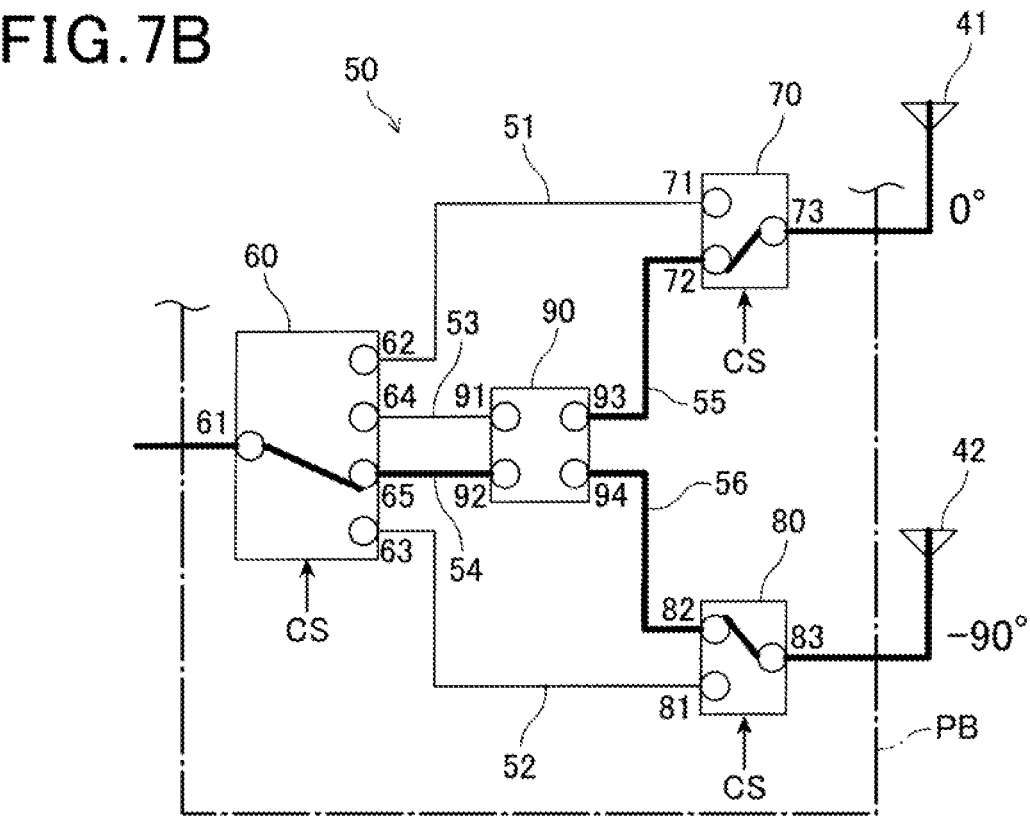
FIG. 7B is an explanatory diagram of a conduction state for circularly polarized waves according to the first embodiment, particularly showing a conduction state for switching to left-handed circularly polarized waves.

Next, a case in which the RFID tag T is read through use of the left-handed circularly polarized waves will be described with reference to FIG. 7B. In this case, based on the switching signal CS sent from the control unit 21, as shown in FIG. 7B, conduction is achieved between the one-side terminal 61 and the other-side terminal 65 in the switch 60, conduction is achieved between the terminal 72 and the terminal 73 in the switch 70, and conduction is achieved between the terminal 82 and the terminal 83 in the switch 80. In this conduction state, as a result of electric power for radio-wave output being supplied from the transmitting/receiving unit 43 controlled by the control unit 21, via the one-side terminal 61 of the switch 60, the electric power supplied to the terminal 94 via the terminal 92 has a phase difference that is a delay by 90 degrees in relation to the electric power supplied to the terminal 93 via the terminal 92. As a result, because the phase of the electric power supplied to the vertically polarized wave antenna 42 is delayed by 90 degrees in relation to the phase of the electric power supplied to the horizontally polarized wave antenna 41, the left-handed circularly polarized radio waves are outputted. The information in the RFID tag T is read based on the radio waves received from the RFID tag T based on the output.

As described above, in the antenna apparatus 40a according to the present embodiment, the switch 60, the distributor 90, the switch 70, the switch 80, and the control unit 21 are provided. The switch 60 has the single one-side terminal 61 and the four other-side terminals 62 to 65. The distributor 90 distributes the electric power supplied via the switch 60 to the terminal 93 and the terminal 94 with a phase difference of 90 degrees. The switch 70 switches between the state in which conduction is achieved between the other-side terminal 62 of the switch 60 and the horizontally polarized wave antenna 41, and the state in which conduction is achieved between the terminal 93 of the distributor and the horizontally polarized wave antenna 41. The switch 80 switches between the state in which conduction is achieved between the other-side terminal 63 of the switch 60 and the vertically polarized wave antenna 42, and the state in which conduction is achieved between the terminal 94 of the distributor and the vertically polarized wave antenna 42. The control unit 21 controls the conduction state of the switches 60, 70, and 80.

Therefore, as a result of control of the switches 60, 70, and 80 by the control unit 21, in the state in which electric power is supplied via the one-side terminal 61, the horizontally polarized radio waves are outputted (transmitted) via the horizontally polarized wave antenna 41 when conduction is achieved between the other-side terminal 62 of the switch 60 and the horizontally polarized wave antenna 41. The vertically polarized radio waves are outputted (transmitted) via the vertically polarized wave antenna 42 when conduction is achieved between the other-side terminal 63 of the switch 60 and the vertically polarized wave antenna 42. In addition, as a result of control of the switches 60, 70, and 80 by the control unit 21, when electric power is supplied to the distributor 90 via the switch 60, the circularly polarized radio waves are outputted (transmitted) because the horizontally polarized radio waves outputted via the horizontally polarized wave antenna 41 and the vertically polarized radio waves outputted via the vertically polarized wave antenna 42 have a phase difference of 90 degrees. In particular, wiring patterns H and V (see FIG. 4) are formed in which the switch 70 and the switch 80 are respectively arranged between the switch 60, and the horizontally polarized wave antenna 41 and the vertically polarized wave antenna 42, and the distributor 90 is disposed between the switch 60, and the switch 70 and the switch 80. Therefore, the wiring pattern H leading from the switch 60 to the horizontally polarized wave antenna 41 and the wiring pattern V leading to the vertically polarized wave antenna 42 can be arranged such as to be physically symmetrical to each other on the printed board. As a result, the wiring pattern H leading to the horizontally polarized wave antenna 41 and the wiring pattern V leading to the vertically polarized wave antenna 42 can physically be wirings of equal lengths. Because phase difference attributed to differences in wiring paths is no longer required to be considered, wiring pattern design does not become complicated. Consequently, an antenna apparatus that enables simplification of wiring pattern design while enabling switching between polarized waves, such as horizontally polarized waves and vertically polarized waves, can be actualized.

In particular, the distributor 90 applies, to the electric power supplied to the terminal 93 via the terminal 91 connected to the other-side terminal 64 of the switch 60, a phase difference that is a delay by 90 degrees in relation to the electric power supplied to the terminal 94 via the terminal 91. In addition, the distributor 90 applies, to the electric power supplied to the terminal 94 via the terminal 92 connected to the other-side terminal 65 of the switch 60, a phase difference that is a delay by 90 degrees in relation to the electric power supplied to the terminal 93 via the terminal 92.

Therefore, the right-handed circularly polarized radio waves can be outputted by the phase of the electric power supplied to the horizontally polarized wave antenna 41 being delayed by 90 degrees in relation to the phase of the electric power supplied to the vertically polarized wave antenna 42. In addition, the left-handed circularly polarized radio waves can be outputted by the phase of the electric power supplied to the vertically polarized wave antenna 42 being delayed by 90 degrees in relation to the phase of the electric power supplied to the horizontally polarized wave antenna 41. Consequently, switching can be performed not only to the horizontally polarized waves and the vertically polarized waves, but also to the two types of circularly polarized waves, the right-handed circularly polarized waves and the left-handed circularly polarized waves. Usefulness can be improved.

Figure 8:
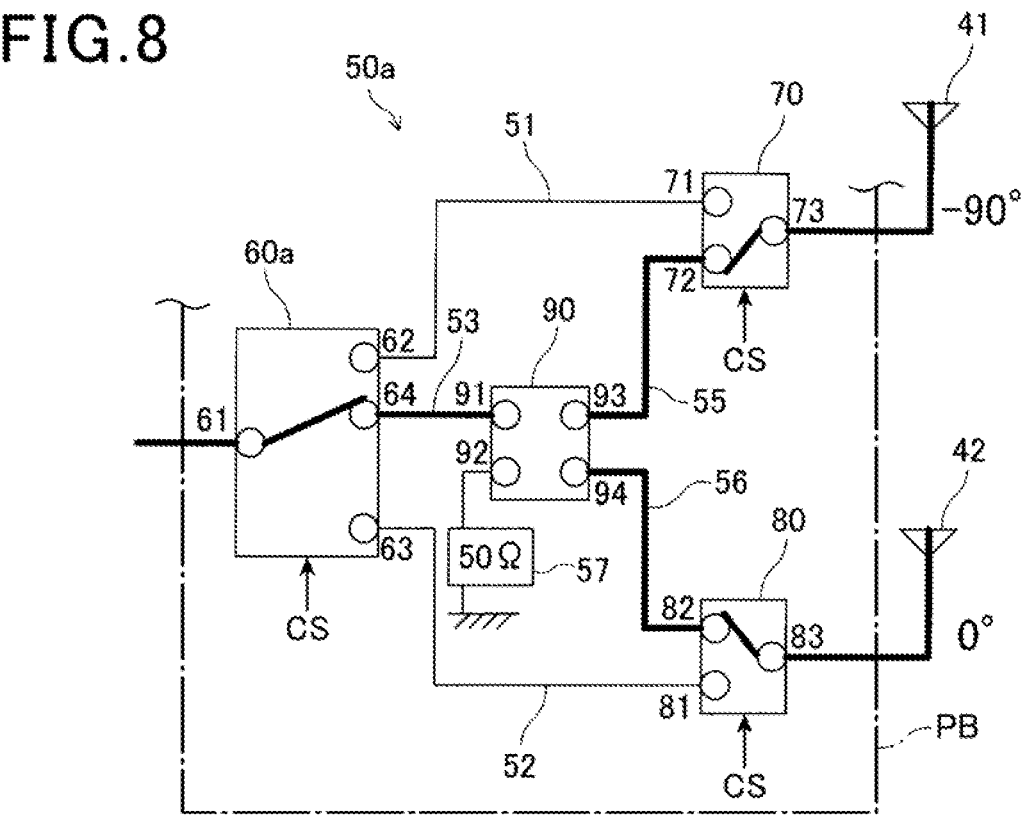
FIG. 8 is a circuit diagram schematically showing the switches and wiring patterns configuring the antenna switching unit of an antenna apparatus of a variation example according to the first embodiment.

As a variation example according to the present embodiment, a configuration in which the terminal 92 of the distributor 90 is connected to a terminating resistor (such as 50Ω), such as an antenna switching unit 50a shown in FIG. 8, is also possible. In this case, a switch (first switch) 60a is configured as a single-pole triple-throw (SP3T) switch that has three other-side terminals 62 to 64. A configuration such as that in which, when conduction is achieved between any one of the other-side terminals and the one-side terminal 61, the remaining other-side terminals are connected to terminal resistors becomes unnecessary.

In this configuration, the horizontally polarized radio waves are outputted via the horizontally polarized wave antenna 41 when conduction is achieved between the terminal 71 and the terminal 73 of the switch 70, and conduction is achieved between the other-side terminal 62 of the switch 60a and the horizontally polarized wave antenna 41. A state enabling output of the vertically polarized radio waves via the vertically polarized wave antenna 42 is achieved when conduction is achieved between the terminal 81 and the terminal 83 of the switch 80, and conduction is achieved between the other-side terminal 63 of the switch 60a and the vertically polarized wave antenna 42. In addition, as shown in FIG. 8, when conduction is achieved between the one-side terminal 61 and the other-side terminal 64 of the switch 6a, between the terminal 72 and the terminal 73 of the switch 70, and between the terminal 82 and the terminal 83 of the switch 80, the electric power supplied to the terminal 93 via the terminal 91 has a phase difference that is a delay by 90 degrees in relation to the electric power supplied to the terminal 94 via the terminal 91. A state enabling output of the right-handed circularly polarized radio waves is achieved.

That is, in the configuration of the variation example, a configuration enabling switching among three types of polarized waves, the horizontally polarized wave, the vertically polarized wave, and the right-handed circularly polarized wave, can be actualized by a configuration that is simpler than the above-described configuration according to the first embodiment.

In the above-described variation example, as a result of a configuration in which the terminal 91 of the distributor 90 is connected to a terminating resistor 57, and the terminal 92 and the other-side terminal 64 of the switch 60a are connected, when conduction is achieved between the one-side terminal 61 and the other-side terminal 64 of the switch 60a, the terminal 72 and the terminal 73 of the switch 70, and the terminal 82 and the terminal 83 of the switch 80, the electric power supplied to the terminal 94 via the terminal 92 has a phase difference that is a delay by 90 degrees in relation to the electric power supplied to the terminal 93 via the terminal 91. A state enabling output of the left-handed circularly polarized radio waves is achieved. In this configuration, a configuration enabling switching among three types of polarized waves, the horizontally polarized wave, the vertically polarized wave, and the left-handed circularly polarized wave, can be actualized.

Second Embodiment

Next, an antenna apparatus according to a second embodiment of the present invention will be described with reference to FIG. 9, FIG. 10A and FIG. 10B.

The antenna apparatus 40*a* according to the present second embodiment differs from the above-described antenna apparatus according to the first embodiment in that the antenna apparatus 40*a* is configured to be capable of switching among four polarized waves that include two types of diagonally polarized waves in addition to the horizontally polarized wave and the vertically polarized wave. Therefore, constituent sections that are essentially identical to those of the antenna apparatus according to the first embodiment are given the same reference numbers. Descriptions thereof are omitted.

Figure 9:
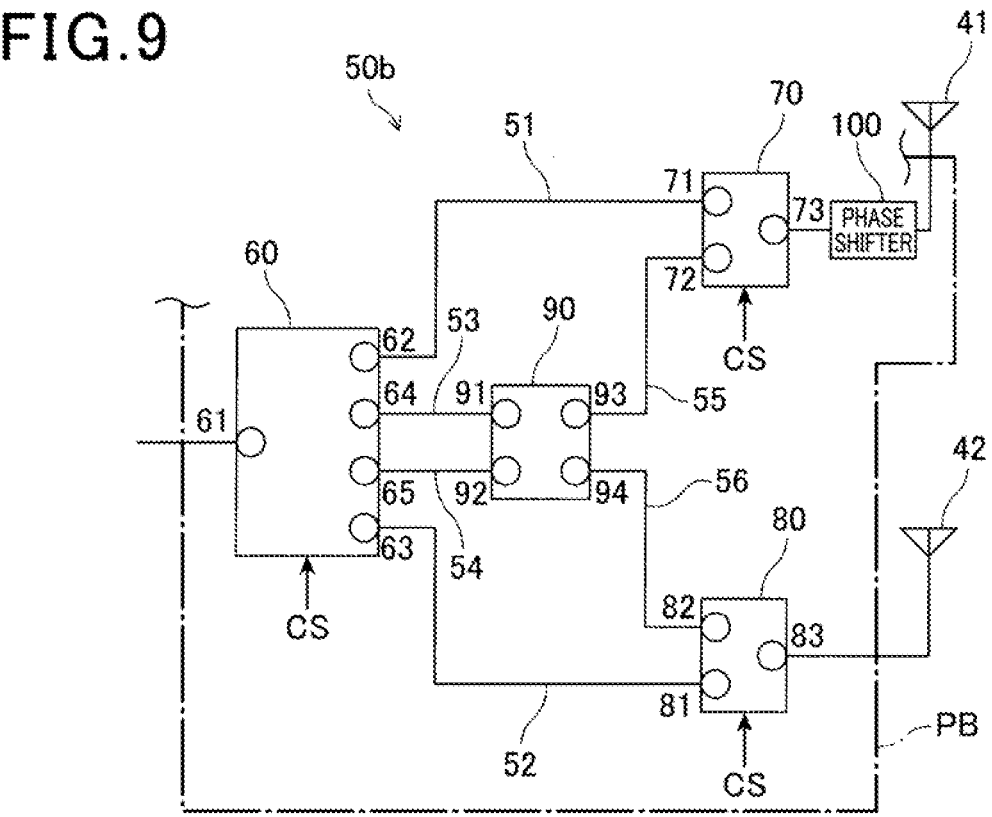
FIG. 9 is a circuit diagram schematically showing switches and wiring patterns configuring an antenna switching unit of an antenna apparatus according to a second embodiment.

According to the present embodiment, an antenna switching unit 50*b* shown in FIG. 9 is used to enable switching among four polarized waves including the two types of diagonally polarized waves in addition to the horizontally polarized waves and the vertically polarized waves. In particular, according to the present embodiment, as the two types of diagonally polarized waves, diagonally polarized waves (also referred to, hereafter, as "first diagonally polarized waves") that are generated by the phase of the electric power supplied to the horizontally polarized wave antenna 41 being delayed by 180 degrees in relation to the phase of the electric power supplied to the vertically polarized wave antenna 42, and diagonally polarized waves (also referred to, hereafter, as "second diagonally polarized waves") that are generated by the phase of the electric power supplied to the horizontally polarized wave antenna 41 and the phase of the electric power supplied to the vertically polarized wave antenna 42 becoming identical are assumed.

The antenna switching unit 50*b* is configured such that a phase shifter 100 is provided in the above-described antenna switching unit 50, between the switch 70 and the horizontally polarized wave antenna 42. The phase shifter 100 applies a delay of 90 degrees to electric power.

In a configuration such as this, in a manner similar to that according to the above-described first embodiment, conduction is achieved between the one-side terminal 61 of the switch 60 and the horizontally polarized wave antenna 41 as a result of conduction being achieved between the one-side terminal 61 and the other-side terminal 62 in the switch 60, and conduction being achieved between the terminal 71 and the terminal 73 in the switch 70. A state enabling output of the horizontally polarized radio waves is achieved. In this conduction state, the phase delay caused by the phase shifter 100 does not affect the switching between polarized waves. In addition, in a manner similar to that according to the above-described first embodiment, conduction is achieved between the one-side terminal 61 of the switch 60 and the vertically polarized wave antenna 42 as a result of conduction being achieved between the one-side terminal 61 and the other-side terminal 63 in the switch 60, and conduction being achieved between the terminal 81 and the terminal 83 in the switch 80. A state enabling output of the vertically polarized radio waves is achieved.

Figure 10A:
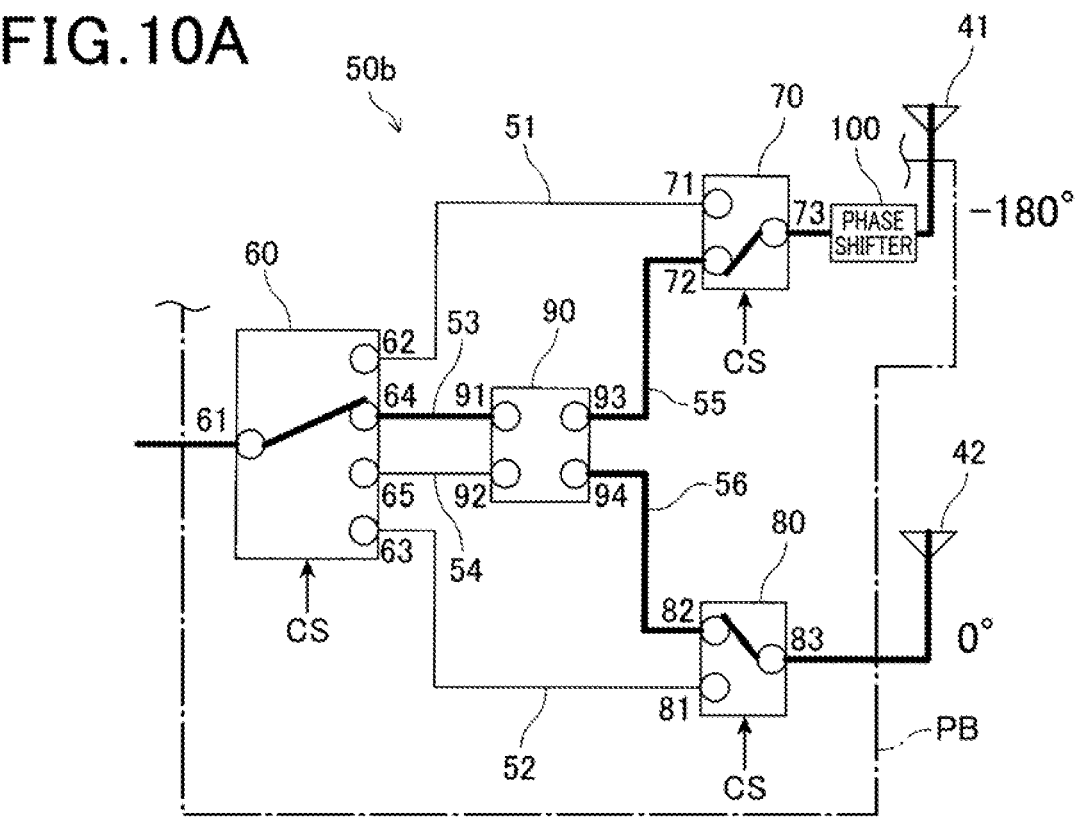
FIG. 10A is an explanatory diagram of a conduction state for diagonally polarized waves according to the second embodiment, particularly showing a conduction state for switching to first diagonally polarized waves.

Furthermore, when the polarized waves are switched to the first diagonally polarized waves, as shown in FIG. 10A, conduction is achieved between the one-side terminal 61 and the other-side terminal 64 in the switch 60, conduction is achieved between the terminal 72 and the terminal 73 in the switch 70, and conduction is achieved between the terminal 82 and the terminal 83 in the switch 80. In this conduction state, the electric power supplied to the terminal 93 via the terminal 91 has a phase difference that is a delay of 90 degrees in relation to the electric power supplied to the terminal 94 via the terminal 91. Furthermore, the electric power supplied via the switch 70 has a phase delay of 90 degrees as a result of the phase shifter 100. Therefore, a state enabling output of the first diagonally polarized radio waves generated by the phase of the electric power supplied to the horizontally polarized wave antenna 41 being delayed by 180 degrees in relation to the phase of the electric power supplied to the vertically polarized wave antenna 42 is achieved.

Figure 10B:
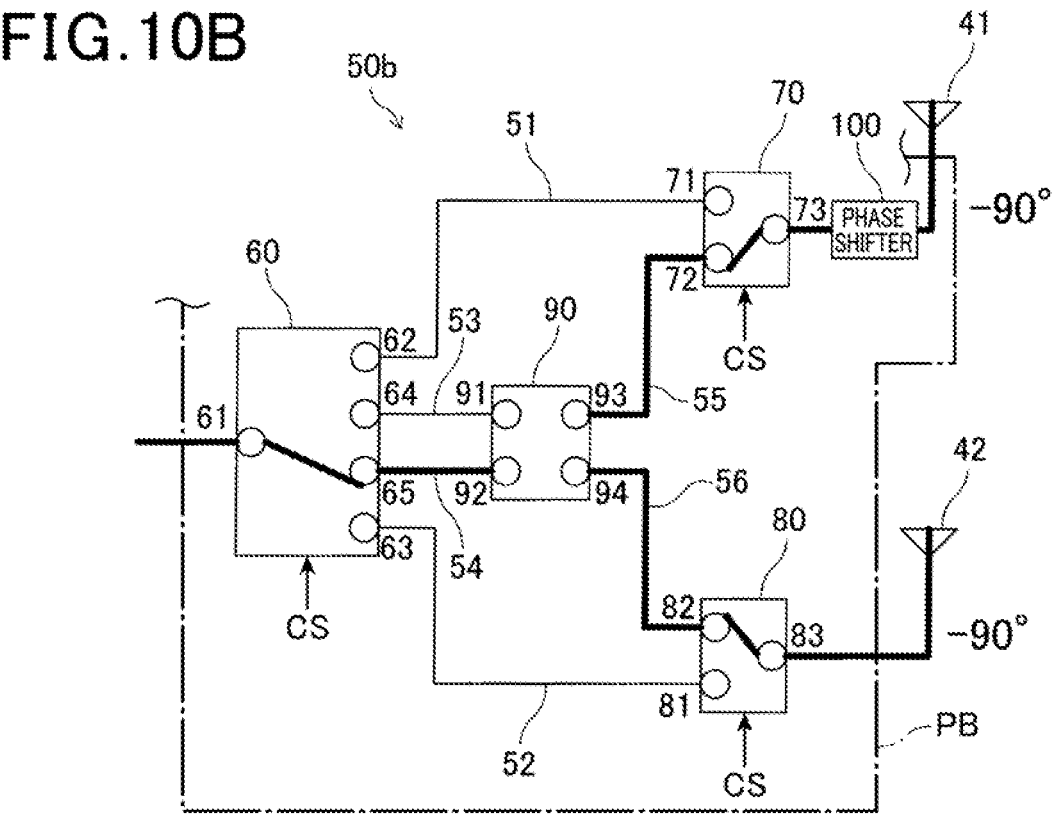
FIG. 10B is an explanatory diagram of a conduction state for diagonally polarized waves according to the second embodiment, particularly showing a conduction state for switching to second diagonally polarized waves.

In addition, when the polarized waves are switched to the second diagonally polarized waves, as shown in FIG. 10B, conduction is achieved between the one-side terminal 61 and the other-side terminal 65 in the switch 60, conduction is achieved between the terminal 72 and the terminal 73 in the switch 70, and conduction is achieved between the terminal 82 and the terminal 83 in the switch 80. In this conduction state, the electric power supplied to the terminal 94 via the terminal 92 has a phase difference that is a delay of 90 degrees in relation to the electric power supplied to the terminal 93 via the terminal 92. Furthermore, the electric power supplied via the switch 70 has a phase delay of 90 degrees as a result of the phase shifter 100. Therefore, a state enabling output of the second diagonally polarized radio waves generated by the phase of the electric power supplied to the horizontally polarized wave antenna 41 and the phase of the electric power supplied to the vertically polarized wave antenna 42 becoming identical is achieved.

In this way, in the antenna apparatus according to the present embodiment, switching can be performed not only to the horizontally polarized waves and the vertically polarized waves, but also to the diagonally polarized waves (second diagonally polarized waves) generated when the phase of the electric power supplied to the horizontally polarized wave antenna 41 and the phase of the electric power supplied to the vertically polarized wave antenna 42 become identical, and the diagonally polarized waves (first diagonally polarized waves) generated when the phase difference between the phase of the electric power supplied to the horizontally polarized wave antenna 41 and the phase of the electric power supplied to the vertically polarized wave antenna 42 is 180 degrees. Usefulness can be improved.

As a variation example according to the present embodiment, the antenna switching unit 50*b* may be configured such that the phase shifter 100 is provided in the above-described antenna switching unit 50, between the switch 80 and the vertically polarized wave antenna 42. The phase shifter 100 applies a delay of 90 degrees to electric power. In this configuration as well, switching can be performed not only to the horizontally polarized waves and the vertically polarized waves, but also to the diagonally polarized waves generated when the phase of the electric power supplied to the horizontally polarized wave antenna 41 and the phase of the electric power supplied to the vertically polarized wave antenna 42 become identical, and the diagonally polarized waves generated when the phase difference between the phase of the electric power supplied to the horizontally polarized wave antenna 41 and the phase of the electric power supplied to the vertically polarized wave antenna 42 is 180 degrees. Usefulness can be improved.

Third Embodiment

Next, an antenna apparatus according to a third embodiment of the present invention will be described with reference to FIG. 11 to FIG. 13A and FIG. 13B.

The antenna apparatus 40a according to the present third embodiment differs from the above-described antenna apparatus according to the second embodiment in that a phase shifter switch 110 is provided. Therefore, constituent sections that are essentially identical to those of the antenna apparatus according to the first embodiment are given the same reference numbers. Descriptions thereof are omitted.

Figure 11:
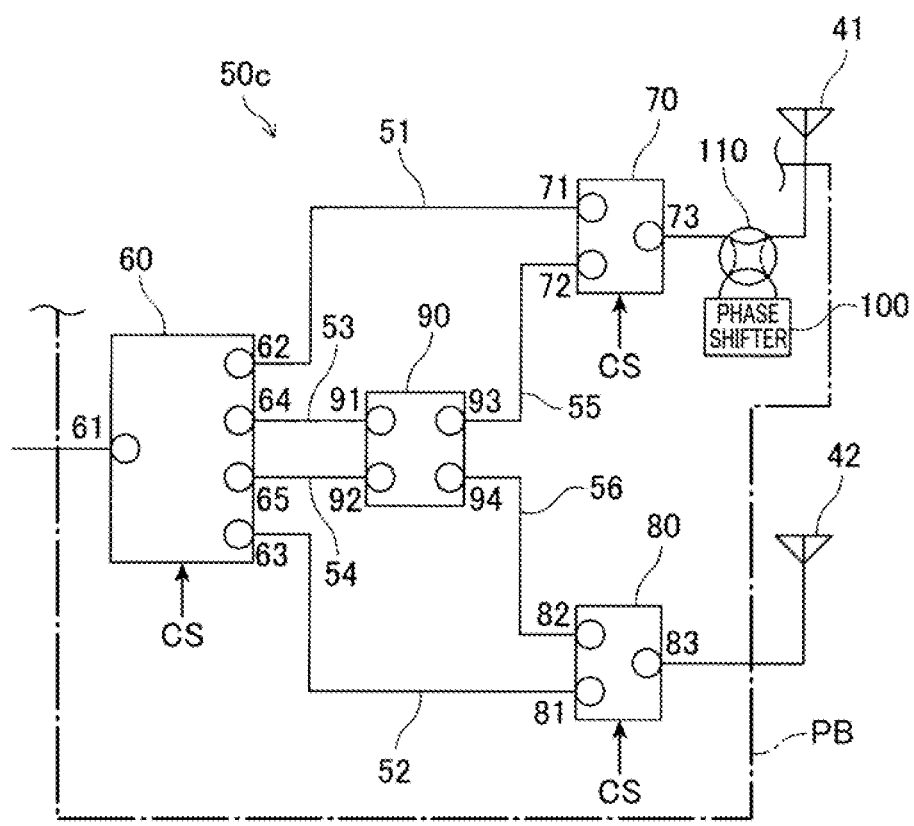
FIG. 11 is a circuit diagram schematically showing switches and wiring patterns configuring an antenna switching unit of an antenna apparatus according to a third embodiment.

According to the present embodiment, an antenna switching unit 50c shown in FIG. 11 is used to enable switching among six polarized waves including two types of circularly polarized waves in addition to the horizontally polarized waves, the vertically polarized waves, and the two types of diagonally polarized waves. The antenna switching unit 50c is configured such that the phase shifter switch 110 is newly provided in the above-described antenna switching unit 50b.

The phase shifter switch 110 functions as a switch that switches to either of a conduction state in which phase shifting by the phase shifter 100 is performed and a conduction state in which phase shifting by the phase shifter 100 is canceled, under the control of the control unit 21. The phase shifter switch 110 is configured as a double-pole double-throw (DPDT) switch that has a terminal connected to the terminal 73 of the switch 70, a terminal connected to the horizontally polarized wave antenna 41, and two terminals connected to the phase shifter 100.

Therefore, when phase shifting by the phase shifter 100 is to be performed, the phase shifter switch 110 is controlled by the control unit 21 such that the terminal 73 of the switch 70 and the horizontally polarized wave antenna 41 are connected via the phase shifter 100, When phase shifting by the phase shifter 100 is to be canceled, the phase shifter switch 110 is controlled by the control unit 21 such that the terminal 73 of the switch 70 and the horizontally polarized wave antenna 41 are directly connected.

In a configuration such as this, in a manner similar to that according to the above-described second embodiment, conduction is achieved between the one-side terminal 61 of the switch 60 and the horizontally polarized wave antenna 41 when conduction is achieved between the one-side terminal 61 and the other-side terminal 62 in the switch 60, and conduction is achieved between the terminal 71 and the terminal 73 in the switch 70. A state enabling output of the horizontally polarized radio waves is achieved. In addition, in a manner similar to that according to the above-described second embodiment, conduction is achieved between the one-side terminal 61 of the switch 60 and the vertically polarized wave antenna 42 when conduction is achieved between the one-side terminal 61 and the other-side terminal 63 in the switch 60, and conduction is achieved between the terminal 81 and the terminal 83 in the switch 80. A state enabling output of the vertically polarized radio waves is achieved.

Figure 12A:
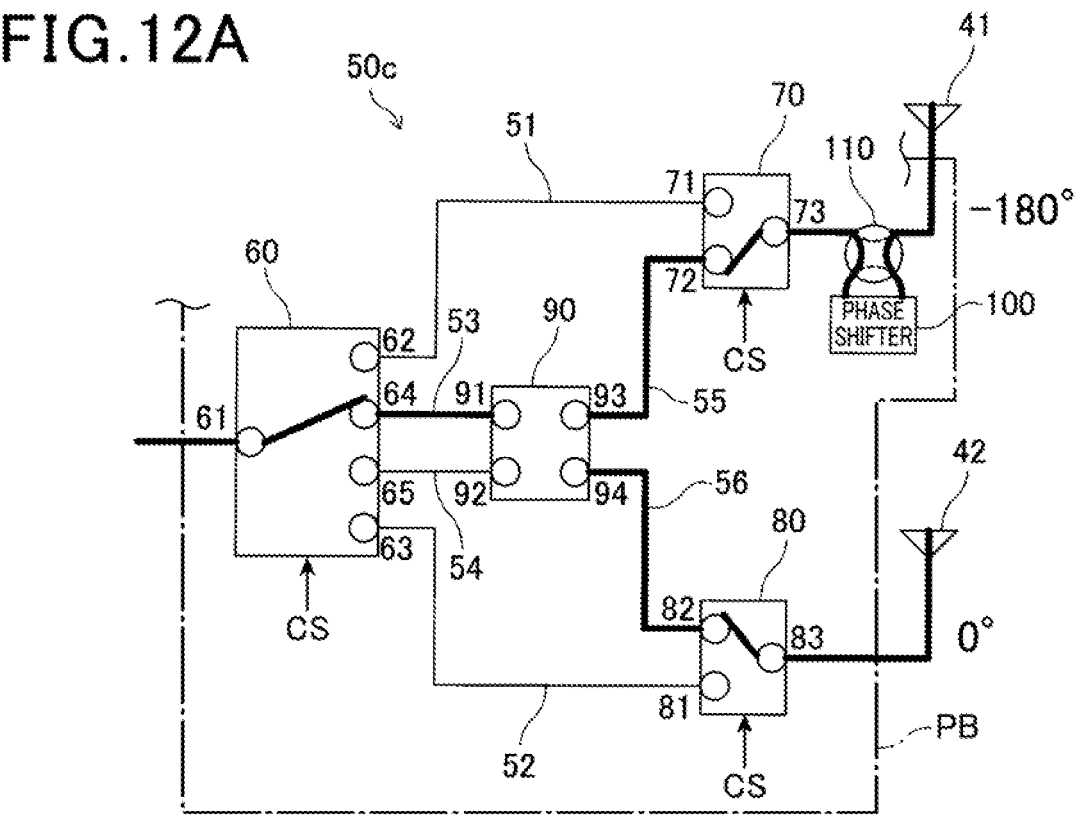
FIG. 12A is an explanatory diagram of a conduction state for diagonally polarized waves according to the third embodiment, particularly showing a conduction state for switching to first diagonally polarized waves.

In addition, when the polarized waves are switched to the first diagonally polarized waves, as shown in FIG. 12A, conduction is achieved between the one-side terminal 61 and the other-side terminal 64 in the switch 60, conduction is achieved between the terminal 72 and the terminal 73 in the switch 70, and conduction is achieved between the terminal 82 and the terminal 83 in the switch 80. Conduction is achieved between the terminal 73 of the switch 70 and the horizontally polarized wave antenna 41 via the phase shifter 100, as a result of the phase shifter switch 110 being controlled. In this conduction state, the electric power supplied to the terminal 93 via the terminal 91 has a phase difference that is a delay of 90 degrees in relation to the electric power supplied to the terminal 94 via the terminal 91. Furthermore, the electric power supplied via the switch 70 has a phase delay of 90 degrees as a result of the phase shifter 100. Therefore, a state enabling output of the first diagonally polarized radio waves generated by the phase of the electric power supplied to the horizontally polarized wave antenna 41 being delayed by 180 degrees in relation to the phase of the electric power supplied to the vertically polarized wave antenna 42 is achieved.

Figure 12B:
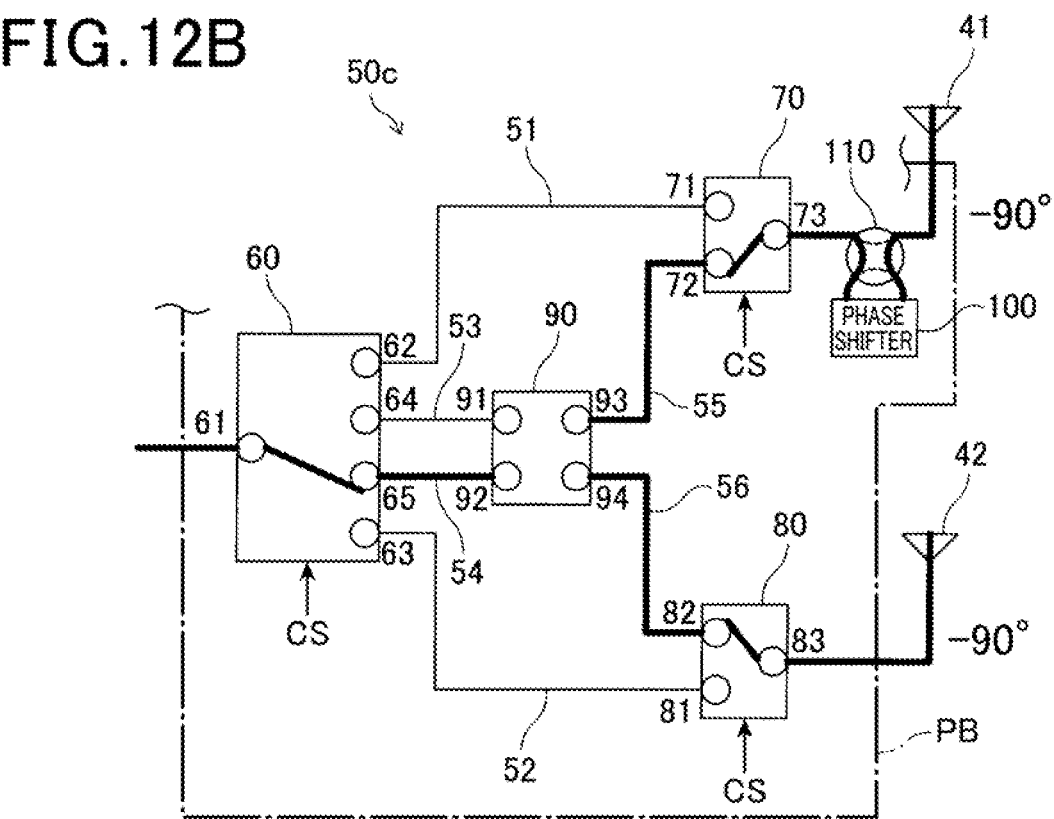
FIG. 12B is an explanatory diagram of a conduction state for diagonally polarized waves according to the third embodiment, particularly showing a conduction state for switching to second diagonally polarized waves.

Furthermore, when the polarized waves are switched to the second diagonally polarized waves, as shown in FIG. 12B, conduction is achieved between the one-side terminal 61 and the other-side terminal 65 in the switch 60, conduction is achieved between the terminal 72 and the terminal 73 in the switch 70, and conduction is achieved between the terminal 82 and the terminal 83 in the switch 80. Conduction is achieved between the terminal 73 of the switch 70 and the horizontally polarized wave antenna 41 via the phase shifter 100, as a result of the phase shifter switch 110 being controlled. In this conduction state, the electric power supplied to the terminal 94 via the terminal 92 has a phase difference that is a delay of 90 degrees in relation to the electric power supplied to the terminal 93 via the terminal 92. Furthermore, the electric power supplied via the switch 70 has a phase delay of 90 degrees as a result of the phase shifter 100. Therefore, a state enabling output of the second diagonally polarized radio waves generated by the phase of the electric power supplied to the horizontally polarized wave antenna 41 and the phase of the electric power supplied to the vertically polarized wave antenna 42 becoming identical is achieved.

Figure 13A:
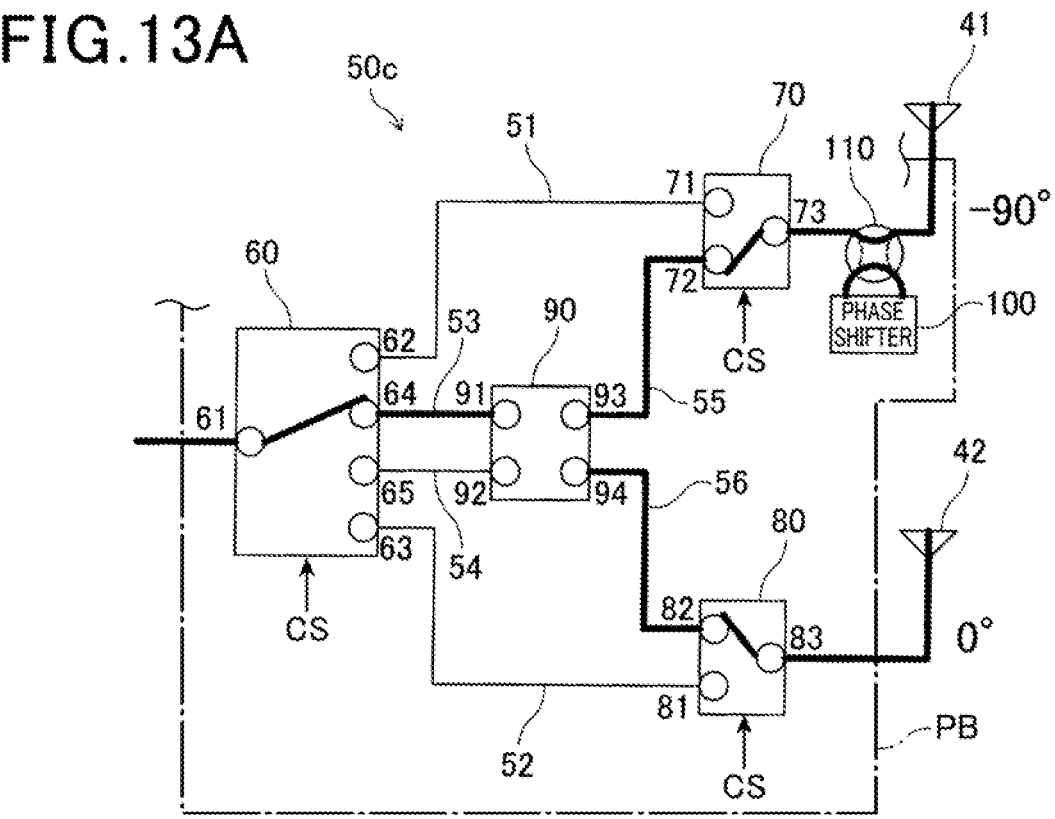
FIG. 13A is an explanatory diagram of a conduction state for circularly polarized waves according to the third embodiment, particularly showing a conduction state for switching to right-handed circularly polarized waves.

In addition, when the polarized waves are switched to the right-handed circularly polarized waves, as shown in FIG. 13A, conduction is achieved between the one-side terminal 61 and the other-side terminal 64 in the switch 60, conduction is achieved between the terminal 72 and the terminal 73 in the switch 70, and conduction is achieved between the terminal 82 and the terminal 83 in the switch 80. Conduction is directly achieved between the terminal 73 of the switch 70 and the horizontally polarized wave antenna 41 without the phase shifter 100 being connected therebetween, as a result of the phase shifter switch 110 being controlled. In this conduction state, the electric power supplied to the terminal 93 via the terminal 91 has a phase difference that is a delay of 90 degrees in relation to the electric power supplied to the terminal 94 via the terminal 91. Therefore, because the phase of the electric power supplied to the horizontally polarized wave antenna 41 is delayed by 90 degrees in relation to the phase of the electric power supplied to the vertically polarized wave antenna 42, a state enabling output of the right-handed circularly polarized waves is achieved.

Figure 13B:
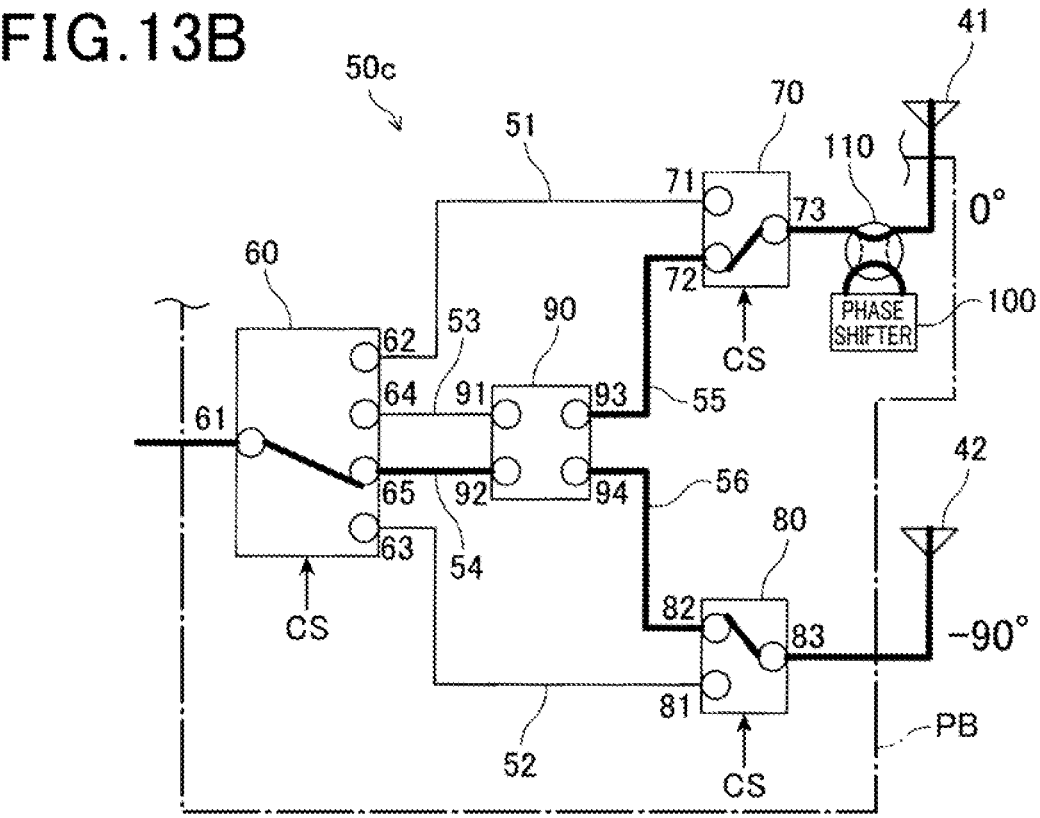
FIG. 13B is an explanatory diagram of a conduction state for circularly polarized waves according to the third embodiment, particularly showing a conduction state for switching to left-handed circularly polarized waves.

Furthermore, when the polarized waves are switched to the left-handed circularly polarized waves, as shown in FIG. 13B, conduction is achieved between the one-side terminal 61 and the other-side terminal 65 in the switch 60, conduction is achieved between the terminal 72 and the terminal 73 in the switch 70, and conduction is achieved between the terminal 82 and the terminal 83 in the switch 80. Conduction is directly achieved between the terminal 73 of the switch 70 and the horizontally polarized wave antenna 41 without the phase shifter 100 being connected therebetween, as a result of the phase shifter switch 110 being controlled. In this conduction state, the electric power supplied to the terminal 94 via the terminal 92 has a phase difference that is a delay of 90 degrees in relation to the electric power supplied to the terminal 93 via the terminal 92. Therefore, because the phase of the electric power supplied to the vertically polarized wave antenna 42 is delayed by 90 degrees in relation to the phase of the electric power supplied to the horizontally polarized wave antenna 41, a state enabling output of the left-handed circularly polarized waves is achieved.

In this way, in the antenna apparatus according to the present embodiment, switching can be performed from the state enabling output of the diagonally polarized radio waves generated by the phase of the electric power supplied to the horizontally polarized wave antenna 41 and the phase of the electric power supplied to the vertically polarized wave antenna 42 becoming identical as a result of phase shifting by the phase shifter 100, to the state enabling output of the circularly polarized radio waves generated by the phase difference between the phase of the electric power supplied to the horizontally polarized wave antenna 41 and the phase of the electric power supplied to the vertically polarized wave antenna 42 becoming 90 degrees as a result of phase shifting by the phase shifter 100 being canceled. In addition, switching can be performed from the state enabling output of the diagonally polarized radio waves generated by the phase difference between the phase of the electric power supplied to the horizontally polarized wave antenna 41 and the phase of the electric power supplied to the vertically polarized wave antenna 42 becoming 180 degrees as a result of phase shifting by the phase shifter 100, to the state enabling output of the circularly polarized radio waves generated by the phase difference between the phase of the electric power supplied to the horizontally polarized wave antenna 41 and the phase of the electric power supplied to the vertically polarized wave antenna 42 becoming 90 degrees as a result of phase shifting by the phase shifter 100 being canceled. Consequently, switching can be performed not only to the horizontally polarized waves, the vertically polarized waves, and the diagonally polarized waves, but also to the circularly polarized waves. Usefulness can be further improved.

Figure 14:
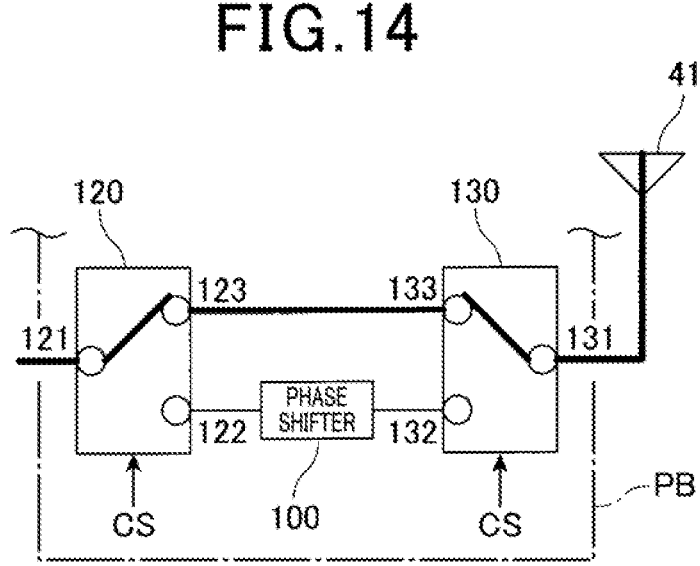
FIG. 14 is a circuit diagram of a circuit for switching a path passing through a 90-degree phase shift line.

Two phase shifter switches 120 and 130 shown in FIG. 14 may be used instead of the phase shifter switch 110. The phase shifter switch 120 is a single-pole double-throw (SPDT) switch that has a single terminal 121 to which electric power is supplied during radio wave output, a terminal 122 connected to the phase shifter 100, and a terminal 123 directly connected to the phase shifter switch 130. The phase shifter switch 120 functions to achieve conduction between either of the terminals 122 and 123, and the single terminal 121, under the control of the control unit 21. The phase shifter switch 130 is a single-pole double-throw (SPDT) switch that has a terminal 131 connected to the horizontally polarized wave antenna 41, a terminal 132 connected to the phase shifter 100, and a terminal 133 directly connected to the phase shifter switch 120. The phase shifter switch 130 functions to achieve conduction between either of the terminals 132 and 133, and the terminal 131, under the control of the control unit 21.

In this configuration as well, switching can be performed to either of the conduction state in which phase shifting by the phase shifter 100 is performed and the conduction state in which phase shifting by the phase shifter 100 is canceled, based on the conduction state of the phase shifter switches 120 and 130 controlled by the control unit 21. In FIG. 14, the conduction state in which phase shifting by the phase shifter 100 is canceled is indicated by conduction being achieved between the terminal 123 and the terminal 121 in the phase shifter switch 120, and conduction being achieved between the terminal 133 and the terminal 131 in the phase shifter switch 130.

Other Embodiments

The present invention is not limited to the above-described embodiments. For example, the present invention may be realized in the following manner.

The antenna apparatus of the present invention is not limited to being mounted in the above-described mobile-type information terminal providing both a function as an RFID reader/writer and a function as an information code reader. For example, the antenna apparatus may be mounted in an information terminal that provides only the function for reading the RFID tag T. Alternatively, the antenna apparatus may be mounted in an information terminal further providing other functions. In addition, the antenna apparatus of the present invention is not limited to being mounted in a mobile-type information terminal, and may be mounted in a stationary-type information terminal.

REFERENCE SIGNS LIST 10 mobile terminal
21 control unit
40 noncontact communicating unit
40a antenna apparatus
41 horizontally polarized wave antenna
42 vertically polarized wave antenna
43 transmitting/receiving unit
50 antenna switching unit
60, 60a switch (first switch)
61 one-side terminal
62 to 65 other-side terminal
70 switch (second switch)
80 switch (third switch)
90 distributor
91 terminal (first distributor one-side terminal)
92 terminal (second distributor one-side terminal)
93 terminal (first distributor other-side terminal)
94 terminal (second distributor other-side terminal)
100 phase shifter
110, 120, 130 phase shifter switch

What is claimed is:
1. An antenna apparatus, comprising:
two polarized wave antennas consisting of a horizontally polarized wave antenna for emitting horizontally polarized radio waves and a vertically polarized wave antenna for emitting vertically polarized radio waves, the horizontally polarized wave and vertically polarized wave antennas: i) being arranged at different positions in the mobile device such that the antennas are physically independent of each other and ii) having polarization planes that are perpendicular to each other;
a first switch that has a single one-side terminal to which electric power from an outside source is supplied during output of the radio waves and a plurality of other-side terminals, and achieves conduction between any one of the plurality of other-side terminals and the one-side terminal;

a distributor that has a first distributor other-side terminal and a second distributor other-side terminal, and distributes the electric power supplied via the first switch to the first distributor other-side terminal and the second distributor other-side terminal with a phase difference of 90 degrees;

a second switch that switches to either of a state in which conduction is achieved between a first other-side terminal of the first switch and the horizontally polarized wave antenna, and a state in which conduction is achieved between the first distributor other-side terminal of the distributor and the horizontally polarized wave antenna;

a third switch that switches to either of a state in which conduction is achieved between a second other-side terminal of the first switch and the vertically polarized wave antenna, and a state in which conduction is achieved between the second distributor other-side terminal of the distributor and the vertically polarized wave antenna;

a first wiring pattern electrically connecting the first switch to the horizontally polarized wave antenna via the distributor and the second switch;

a second wiring pattern electrically connecting the first switch to the vertically polarized wave antenna via the distributer and the third switch, the first and second wiring patterns being equal to each other in a physical length thereof; and a control unit that switches the conduction state of the first switch, the second switch, and the third switch such that at least either of the horizontally polarized wave antenna and the vertically polarized wave antenna emits polarized radio waves including circularly polarized radio waves.

2. The antenna apparatus according to claim 1, wherein:
the distributor has a first distributor one-side terminal connected to a third other-side terminal of the first switch and a second distributor one-side terminal connected to a fourth other-side terminal of the first switch;
the electric power supplied to the first distributor other-side terminal via the first distributor one-side terminal has a phase difference that is a delay of 90 degrees in relation to the electric power supplied to the second distributor other-side terminal via the first distributor one-side terminal; and
the electric power supplied to the second distributor other-side terminal via the second distributor one-side terminal has a phase difference that is a delay of 90 degrees in relation to the electric power supplied to the first distributor other-side terminal via the second distributor one-side terminal.

3. The antenna apparatus according to claim 1, wherein:
a phase shifter that applies a delay of 90 degrees to electric power is provided between either of the second switch and the horizontally polarized wave antenna, and the third switch and the vertically polarized wave antenna.

4. The antenna apparatus according to claim 3, comprising:
a phase shifter that switches to either of a conduction state in which phase shifting by the phase shifter is performed and a conduction state in which phase shifting by the phase shifter is canceled, wherein
the control unit further controls the conduction state of the phase shifter.

5. The antenna apparatus according to claim 1, wherein:
the antenna apparatus is mounted in a mobile terminal; and
an information reading apparatus that optically reads information in an information code is mounted in the mobile terminal.

6. The antenna apparatus according to claim 2, wherein:
a phase shifter that applies a delay of 90 degrees to electric power is provided between either of the second switch and the horizontally polarized wave antenna, and the third switch and the vertically polarized wave antenna.

7. The antenna apparatus according to claim 6, comprising:
a phase shifter that switches to either of a conduction state in which phase shifting by the phase shifter is performed and a conduction state in which phase shifting by the phase shifter is canceled, wherein
the control unit further controls the conduction state of the phase shifter.

8. The antenna apparatus according to claim 7, wherein:
the antenna apparatus is mounted in a mobile terminal; and
an information reading apparatus that optically reads information in an information code is mounted in the mobile terminal.

9. The antenna apparatus according to claim 6, wherein:
the antenna apparatus is mounted in a mobile terminal; and
an information reading apparatus that optically reads information in an information code is mounted in the mobile terminal.

10. The antenna apparatus according to claim 3, wherein:
the antenna apparatus is mounted in a mobile terminal; and
an information reading apparatus that optically reads information in an information code is mounted in the mobile terminal.

11. The antenna apparatus according to claim 1, comprising:
a printed board on which the first switch, the distributor, the second switch, the third switch, and the first and second wiring patterns are arranged,
wherein the first and second wiring patterns are arranged to have mutually-symmetrical paths of the equal physical length on the same printed board.

12. The antenna apparatus according to claim 11, wherein:
the distributor has a first distributor one-side terminal connected to a third other-side terminal of the first switch and a second distributor one-side terminal connected to a fourth other-side terminal of the first switch;
the electric power supplied to the first distributor other-side terminal via the first distributor one-side terminal has a phase difference that is a delay of 90 degrees in relation to the electric power supplied to the second distributor other-side terminal via the first distributor one-side terminal; and
the electric power supplied to the second distributor other-side terminal via the second distributor one-side terminal has a phase difference that is a delay of 90 degrees in relation to the electric power supplied to the first distributor other-side terminal via the second distributor one-side terminal.

13. The antenna apparatus according to claim 1, wherein:
the antenna apparatus is mounted in a stationary information terminal, and an information reading apparatus that optically reads information in an information code is mounted in the stationary information terminal.

* * * * *